United States Patent
Suzuki

(10) Patent No.: US 12,420,702 B2
(45) Date of Patent: Sep. 23, 2025

(54) VEHICLE PROJECTION DEVICE, CONTROL METHOD THEREFOR, AND VEHICLE LAMP

(71) Applicant: Ichikoh Industries, Ltd., Isehara (JP)

(72) Inventor: Yasufumi Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 180 days.

(21) Appl. No.: 18/260,286

(22) PCT Filed: Jan. 6, 2022

(86) PCT No.: PCT/JP2022/000272
§ 371 (c)(1),
(2) Date: Jul. 3, 2023

(87) PCT Pub. No.: WO2022/149600
PCT Pub. Date: Jul. 14, 2022

(65) Prior Publication Data
US 2024/0059214 A1    Feb. 22, 2024

(30) Foreign Application Priority Data

Jan. 7, 2021  (JP) .................................. 2021-001689
Dec. 28, 2021 (JP) .................................. 2021-214893

(51) Int. Cl.
*B60Q 1/46*     (2006.01)
*B60Q 1/34*     (2006.01)
(Continued)

(52) U.S. Cl.
CPC ............... *B60Q 1/46* (2013.01); *B60Q 1/346* (2013.01); *H05B 47/16* (2020.01); *F21S 43/26* (2018.01);
(Continued)

(58) Field of Classification Search
CPC .......... B60Q 1/46; B60Q 1/346; B60Q 1/381; B60Q 2400/50; B60Q 1/38; H05B 47/16;
(Continued)

(56) References Cited

FOREIGN PATENT DOCUMENTS

AU    2018270908 B2  *  2/2020    ............. B60R 11/04
JP    2016193689 A   *  11/2016
(Continued)

OTHER PUBLICATIONS

International Search Report issued Feb. 22, 2022 in PCT/JP2022/000272 filed on Jan. 6, 2022 2 pages.
(Continued)

*Primary Examiner* — Abdullah A Riyami
*Assistant Examiner* — Syed M Kaiser
(74) *Attorney, Agent, or Firm* — Oblon, McClelland, Maier & Neustadt, L.L.P.

(57) ABSTRACT

A lighting timing or lighting mode of a projection unit requires improvement in relation to lighting of a turn lamp. A vehicle lamp includes: a projection unit that includes a light source and projects a predetermined image onto a road surface based on lighting of the light source; and a lighting control unit that controls the light source. The lighting control unit controls the light source such that a required time period from a first time point at which the light source starts lighting in response to an input of a turn signal or a hazard signal to a second time point at which the light source reaches a target light intensity ends later than a third time point at which a turn lamp or a hazard lamp is lit at a target light intensity thereof in response to the input of the turn signal or the hazard signal.

17 Claims, 19 Drawing Sheets

(51) Int. Cl.
    *F21S 43/20*     (2018.01)
    *F21W 103/20*     (2018.01)
    *F21W 103/30*     (2018.01)
    *F21W 103/60*     (2018.01)
    *H05B 47/16*     (2020.01)

(52) U.S. Cl.
    CPC ..... *F21W 2103/20* (2018.01); *F21W 2103/30* (2018.01); *F21W 2103/60* (2018.01)

(58) Field of Classification Search
    CPC .......... F21S 43/26; F21S 43/14; F21S 43/255; F21W 2103/20; F21W 2103/30; F21W 2103/60
    See application file for complete search history.

(56) References Cited

FOREIGN PATENT DOCUMENTS

| | | | | | |
|---|---|---|---|---|---|
| JP | 2019131184 A | * | 8/2019 | ............. | B60K 35/00 |
| KR | 2019131184 A | * | 11/2019 | ............... | H02G 1/04 |

OTHER PUBLICATIONS

Extended European Search Report issued Oct. 1, 2024, in corresponding European Patent Application No. 22736768.7, 8 pages.
Office Action issued Oct. 3, 2024, in corresponding Japanese Patent Application No. 2021-214893 (with English Translation), 10 pages.

* cited by examiner

VEHICLE PROJECTION DEVICE, CONTROL METHOD THEREFOR, AND VEHICLE LAMP

TECHNICAL FIELD

The present disclosure relates to a vehicle projection device, a control method therefor, and a vehicle lamp.

BACKGROUND ART

Technology has been developed to improve safety by projecting a pattern (e.g., an arrow) that indicates the vehicle traveling direction on the road surface. For example, when the vehicle turns left or changes lanes to the left, an arrow pointing obliquely to the left-front direction is projected on the road surface on the left side in front of the vehicle. This alerts pedestrians and drivers surrounding the vehicle. This can also reduce the risk that the blinking of the left front lamp of the vehicle in response to the turn signal is not immediately visually recognized by the surrounding pedestrians and drivers due to traffic conditions surrounding the vehicle (a level of vehicle congestion) or buildings (a wall along the road, etc.).

Patent literature 1 discloses technology of starting to draw a marker on the road surface indicating the vehicle traveling direction when the turn signal lamp is turned on, and finishing drawing the marker when the turn signal lamp is turned off.

CITATION LIST

Patent Literature

Patent Literature 1: JP 2016-193689 A

SUMMARY OF THE INVENTION

Problems to be Solved by the Invention

There is room for improvement in the lighting timing or lighting mode of the projection unit in relation to the lighting of the turn lamp.

Means for Solving the Problem

A vehicle projection device according to one aspect of the present disclosure includes a projection unit that includes a light source and projects a predetermined image onto a road surface based on lighting of the light source, and a lighting control unit that performs lighting control of at least the light source of the projection unit, in which: the lighting control unit is configured to perform the lighting control of the light source of the projection unit such that a required time period from a first time point at which the light source of the projection unit starts lighting in response to an input of a turn signal or a hazard signal to a second time point at which the light source of the projection unit reaches a target light intensity ends later than a third time point at which a turn lamp or a hazard lamp is lit at a target light intensity thereof in response to the input of the turn signal or the hazard signal.

In some embodiments, the required time period is 200 ms or less.

In some embodiments, the predetermined image includes a plurality of sub-regions, the projection unit includes a plurality of light sources provided for individual projection of the plurality of sub-regions, and the lighting control unit is configured to (i) start lighting of the plurality of light sources in a predetermined order in response to the input of the turn signal or the hazard signal and is configured to (ii) perform the lighting control of the plurality of light sources such that the required time period of each light source of the plurality of light sources ends later than the third time point.

In some embodiments, the lighting control unit is configured to perform the lighting control of the plurality of light sources such that the required time period of each light source of the plurality of light sources has the same time length.

In some embodiments, the lighting control unit is configured to perform the lighting control of the plurality of light sources such that the required time period of each light source of the plurality of light sources has a different time length.

In some embodiments, the lighting control unit is configured to perform the lighting control of the plurality of light sources such that the plurality of light sources reach the target light intensity at the same time and/or the plurality of light sources are turned off at the same time.

In some embodiments, the lighting control unit is configured to generate a plurality of pulse width modulation (PWM) signals for individual lighting control of the plurality of light sources.

In some embodiments, the lighting control unit is configured to perform the lighting control of the light source such that the light source has the continuously changing light intensity during the required time period.

The vehicle projection device according to one aspect of the present disclosure includes the projection unit that includes the light source and projects the predetermined image onto the road surface based on lighting of the light source, and the lighting control unit that performs the lighting control of the light source. The lighting control unit is configured to perform the lighting control of the light source such that the required time period from the first time point at which the light source starts lighting in response to the input of the turn signal or the hazard signal to the second time point at which the light source reaches the target light intensity is shortened as a speed of the own vehicle increases. According to the present device, it is possible to achieve the optimized projection for both low-speed traveling and high-speed traveling. That is, it is possible to gently alert the surrounding pedestrians and drivers during the low-speed traveling. It is possible to quickly alert the surrounding pedestrians and drivers during the high-speed traveling. Note that the light source is controlled so that the light intensity increases stepwise or continuously over the required time period.

In some embodiments, the lighting control unit is configured to perform the lighting control of the light source such that the required time period is prolonged as the speed of the own vehicle decreases.

In some embodiments, the lighting control unit is configured to stepwise or continuously adjust a duty ratio of the PWM signal during the required time period inversely proportional to the own vehicle speed. The lighting control unit can include a PWM signal generation unit and an adjustment signal generation unit that generates an adjustment signal for adjusting the duty ratio of the PWM signal generated by the PWM signal generation unit. The adjustment signal can be a lamp signal specifying the duty ratio. An increase rate of the lamp signal can be adjusted to be proportional to the own vehicle speed.

In some embodiments, the own vehicle speed referred to for adjusting the required time period is acquired in synchronization with a rising of the turn signal or the hazard signal. The own vehicle speed is acquired at multiple times, and a change rate of the duty ratio of the PWM signal can be changed.

In some embodiments, the predetermined image includes a plurality of mutually distinguishable sub-regions, and the projection unit is controlled to sequentially project the plurality of sub-regions onto the road surface in synchronization with the turn signal or the hazard signal.

In some embodiments, the projection unit further includes a light shielding member provided with a plurality of transmission units that selectively transmit light emitted from the light source and a condenser lens that is disposed between the light source and the light shielding member and condenses the light emitted from the light source into the plurality of transmission units.

In some embodiments, the projection unit is controlled to simultaneously project a plurality of images corresponding to the plurality of transmission units onto the road surface in synchronization with the turn signal or the hazard signal, or sequentially project each image included in the plurality of images corresponding to the plurality of transmission units onto the road surface in synchronization with the turn signal or the hazard signal.

A vehicle lamp according to another aspect of the present disclosure includes any of the vehicle projection devices described above and a turn lamp that blinks in synchronization with the turn signal. The turn lamp can be subjected to the lighting control so as to start lighting at a time point later than a time point at which the light source of the projection unit starts lighting.

A method for controlling a vehicle projection device according to still another aspect of the present disclosure is a method for controlling the above-mentioned vehicle projection device, the method including: a step in which the lighting control unit receives the turn signal or the hazard signal; and a step in which the lighting control unit performs the lighting control of the light source such that the required time period from the first time point at which the light source starts lighting in response to the turn signal or the hazard signal to the second time point at which the light source reaches the target light intensity is shortened as a speed of an own vehicle increases.

The method according to yet another aspect of the present disclosure is a method for controlling the vehicle projection device which includes: a projection unit that includes a light source and projects a predetermined image onto a road surface based on lighting of the light source; and a lighting control unit that performs lighting control of at least the light source of the projection unit, the method including: a step in which the lighting control unit receives a turn signal or a hazard signal; and a step in which the lighting control unit performs the lighting control of the light source of the projection unit such that a required time period from a first time point at which the light source of the projection unit starts lighting in response to the turn signal or the hazard signal to a second time point at which the light source of the projection unit reaches a target light intensity ends later than a third time point at which a turn lamp or a hazard lamp is lit at a target light intensity thereof in response to an input of the turn signal or the hazard signal.

Effect of the Invention

According to one aspect of the present disclosure, it is possible to improve the lighting timing or lighting mode of the projection unit in relation to the lighting of the turn lamp.

MODE FOR CARRYING OUT THE INVENTION

Non-limiting embodiments and features of the present invention will be described below with reference to the drawings. Each embodiment and/or each feature can be combined without excessive description by a person skilled in the art, and the synergistic effects of this combination can also be understood by a person skilled in the art. Duplicate descriptions of the embodiments will be omitted in principle. The reference drawings are mainly intended for describing the invention and are simplified for convenience of drawing. Each feature is not only effective for the vehicle lamp disclosed in the present specification but is understood as a universal feature applicable to various other vehicle lamps not disclosed in the present specification.

In the present specification, the front-rear direction, the left-right direction, and the up-down direction are determined with respect to a vehicle 1 as a reference. The vehicle inward direction is any direction from the outside of the vehicle to the inside of the vehicle. The vehicle outward direction is any direction from the inside of the vehicle to the outside of the vehicle. The up-down direction coincides with or extends along the vertical direction.

Figure 1:
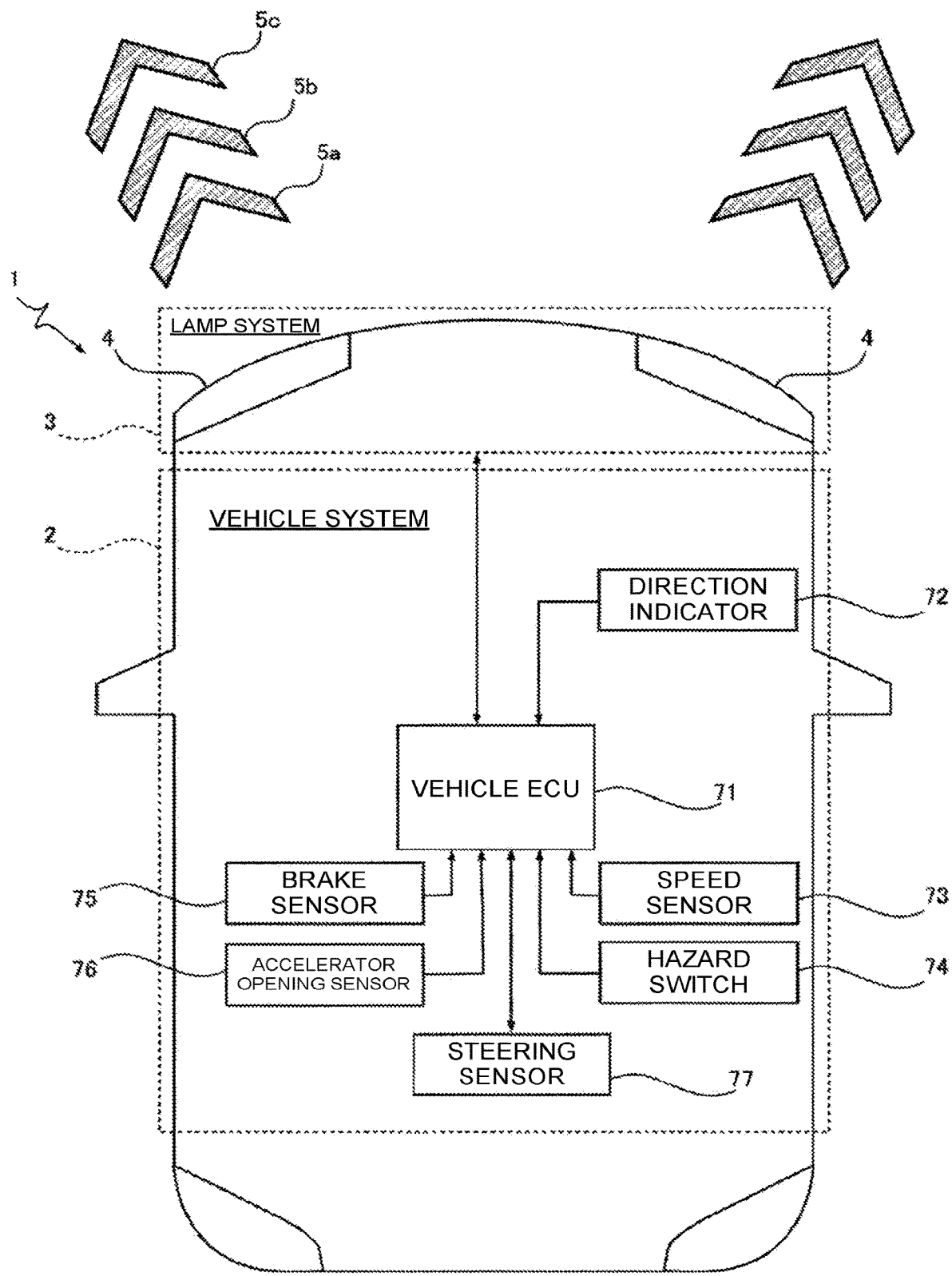
FIG. 1 is a schematic diagram of a system configuration of a vehicle according to one aspect of the present disclosure.

The vehicle 1 is a two-wheeled, three-wheeled, or four-wheeled self-propelled mobile object and is driven by power generated by an internal combustion engine or an electric motor. The vehicle 1 is configured by mounting a vehicle lamp on a vehicle main body, and the vehicle main body and the vehicle lamp include a vehicle system 2 and a lamp system 3, respectively. The vehicle system 2 is configured by connecting individual elements via an in-vehicle network. FIG. 1 shows, for convenience of description, a part of elements included in the vehicle system 2 (a vehicle electronic control unit (ECU) 71, a direction indicator 72, a speed sensor 73, a hazard switch 74, a brake sensor 75, an accelerator opening sensor 76, and a steering sensor 77).

The vehicle ECU 71 can be configured from one or more sub-ECUs. The direction indicator 72 is operated by the driver's voice, hand, foot, or the like and generates a turn signal. The hazard switch 74 is operated by the driver's voice, hand, foot, or the like and generates a hazard signal. These turn signal and hazard signal are transmitted to the lamp system 3 through or not through the vehicle ECU 71.

Figure 2:
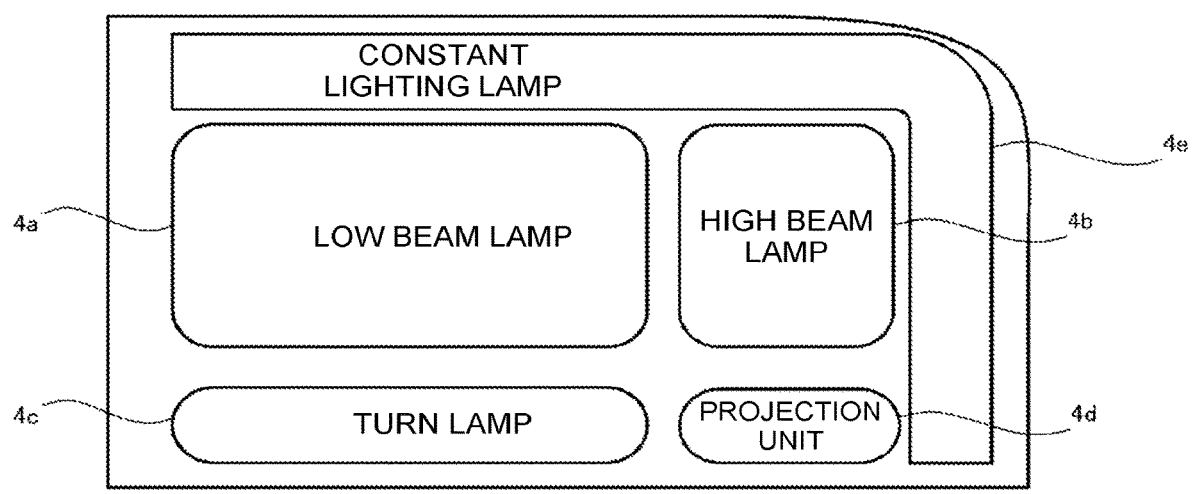
FIG. 2 is a diagram illustrating a schematic configuration of a front lamp according to one aspect of the present disclosure.

The lamp system 3 includes left and right front lamps (vehicle lamps) 4 for illuminating the front in the vehicle traveling direction. Each front lamp 4, for example, as shown in FIG. 2, includes a low beam lamp 4a, a high beam lamp 4b, a turn lamp 4c, a projection unit 4d, and a constant lighting lamp 4e, which are provided in a common lamp chamber. Note that the lamp chamber is defined by mounting an outer lens on a recessed housing.

The turn lamp 4c blinks in synchronization with the turn signal and the hazard signal, that is, it starts lighting in response to a rising of the signal and is turned off in response to a falling of the signal. The turn lamp 4c can include, as a light source, one or more semiconductor light emitting elements such as an LED (light emitting diode) and an LD (laser diode) without being limited thereto. A halogen bulb, an incandescent bulb, and the like can also be adopted. The turn lamp 4c can be of a sequential type without being limited thereto.

The projection unit 4d projects a predetermined image onto a road surface in synchronization with the turn signal and the hazard signal, that is, it starts projecting the predetermined image onto the road surface in response to the rising of the signal and stops projecting the predetermined image onto the road surface in response to the falling of the signal. The projection unit 4d operates such that the light intensity of the light source increases stepwise or continuously, and as a result, the illuminance of the predetermined image projected on the road surface increases stepwise or continuously. When the vehicle is traveling at a low speed, the projection unit 4d can gently alert surrounding pedestrians and drivers. The projection unit 4d will be further described below with reference to FIG. 3 to FIG. 8. Note that the projection unit 4d does not need to be disposed adjacent to the turn lamp 4c, and it can be disposed, for example, outside the front lamp (e.g., in a side mirror). As for the low beam lamp 4a, the high beam lamp 4b, and the constant lighting lamp 4e, those known in these fields can be adopted, and detailed description thereof will be omitted.

As shown in FIG. 1, three arrows 5a to 5c are projected onto the road surface from the projection unit 4d of the left front lamp. Each of the arrows 5a to 5c is for notifying the surroundings that the vehicle 1 is traveling to the left, and, in this drawing, each arrow is formed in a flat inverted V shape as an example. The arrows 5a to 5c are projected onto the road surface along the direction away from the vehicle 1. As will be understood from the description below, when the vehicle 1 travels at a low speed, the arrows 5a to 5c stepwise or continuously become brighter to a target illuminance over a longer period of time, making it possible to gently alert the surrounding pedestrians and drivers. When the vehicle 1 travels at a high speed, the arrows 5a to 5c stepwise or continuously become brighter to the target illuminance over a shorter period of time, making it possible to quickly alert the surrounding pedestrians and drivers. That is, the projection of the arrows 5a to 5c is optimized for the current traveling speed of the vehicle 1. Note that the same description applies to the projection unit of the right front lamp. Further, the same type of projection unit can be used for a rear lamp of the vehicle 1.

Figure 3:
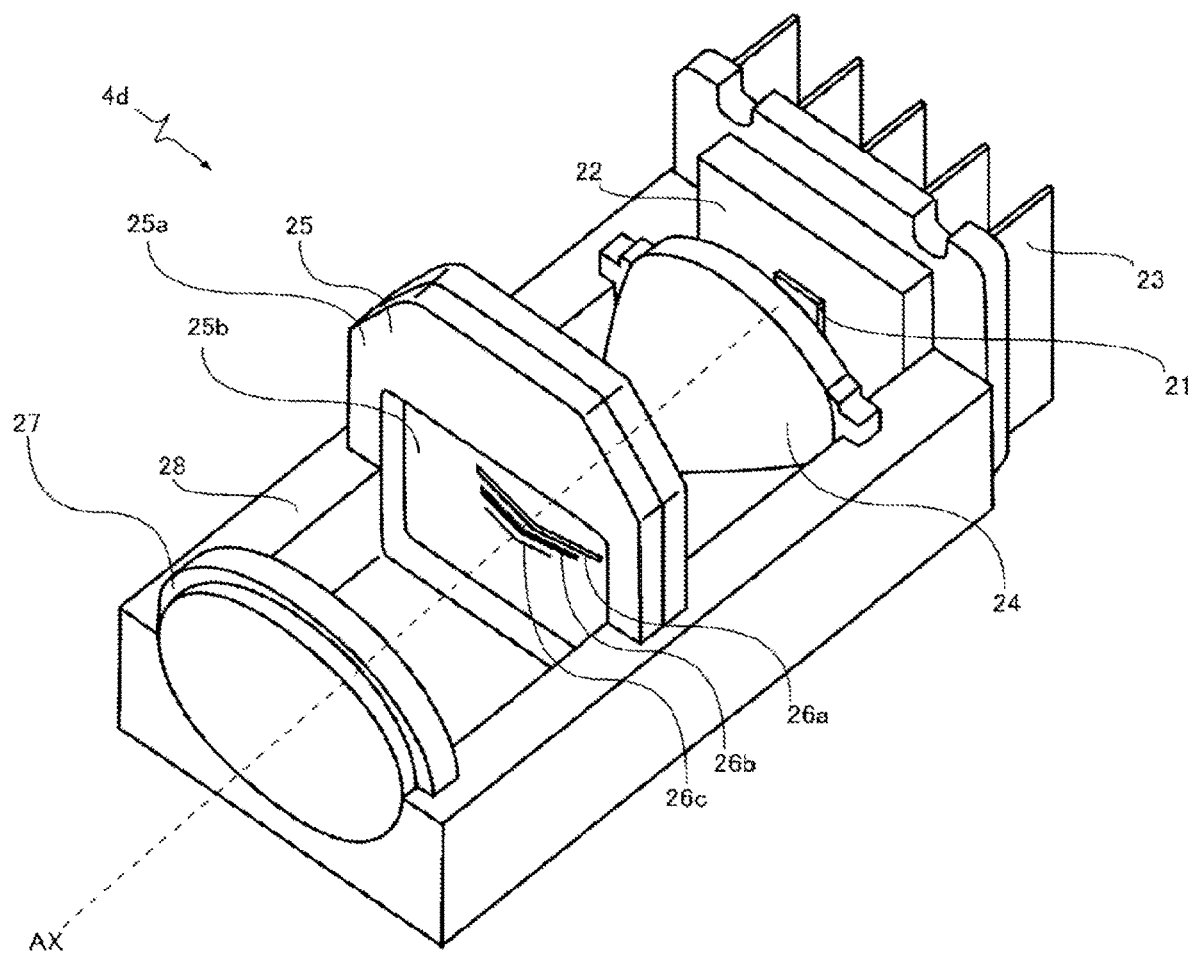
FIG. 3 is a schematic perspective view of a projection unit of a projection device according to one aspect of the present disclosure.

As shown in FIG. 3, the projection unit 4d of the projection device includes a light source 21, a mounting substrate 22, a heat sink 23, a condenser lens 24, a light shielding member 25 including transmission units 26a, 26b, and 26c, a projection lens 27, and a housing 28. The light source 21 includes one or more or two or more semiconductor light emitting elements such as LEDs and LDs. However, the light source 21 is not necessarily limited to this configuration. The light source 21 may be configured as a module in which the semiconductor light emitting elements are arranged in a matrix. Heat generated by the energization of the semiconductor light emitting elements is transferred to the heat sink 23 through or not through the mounting substrate 22 and is dissipated.

The condenser lens 24 converges light beams emitted from the light source 21 onto the transmission units 26a, 26b, and 26c of the light shielding member 25, thereby increasing light utilization efficiency. The projection lens 27 projects the light transmitted through the transmission units 26a, 26b, and 26c of the light shielding member 25 onto the road surface in front of the vehicle 1. The light source 21, the condenser lens 24, the light shielding member 25, and the projection lens 27 are housed in the housing 28, which can prevent the occurrence of stray light in the lamp chamber. The housing 28 is configured by combining a lower housing (shown in FIG. 3) and an upper housing. An optical axis AX of the projection unit 4d extends obliquely downwardly to the front direction and obliquely intersects the horizontal direction perpendicular to the vertical direction. However, the optical axis AX is not necessarily limited to this configuration.

The light shielding member 25 is provided with a plurality of transmission units 26a, 26b, and 26c that selectively transmit the light emitted from the light source 21. The light shielding member 25 has a structure in which a filter 25b is attached to a frame 25a. The filter 25b is provided with one or more (three in this example) transmission units 26a, 26b, and 26c corresponding to the predetermined image to be projected on the road surface, and the light emitted from the light source 21 is transmitted or blocked depending on the incident position of the light. The transmission units 26a, 26b, and 26c are arranged in this order from the top in the up-down direction. The filter 25b can be formed, for example, by forming a light absorption layer or a light reflection layer on one surface of a transparent substrate and removing the light absorption layer or the light reflection layer corresponding to the predetermined image.

The light emitted from the light source 21 propagates through the condenser lens 24, the transmission units 26a, 26b, and 26c, and the projection lens 27 along the optical axis AX of the projection unit 4d (the condenser lens 24 or the projection lens 27). The light beams are condensed on the transmission units 26a, 26b, and 26c of the light shielding member 25 by the condenser lens 24. An image formed by the light beams transmitted through the transmission units 26a, 26b, and 26c is inverted through the projection lens 27 and projected onto the road surface in front of the vehicle 1.

Specifically, the light beams that have transmitted through the transmission unit 26c are refracted by front and rear lens surfaces of the projection lens 27 and projected onto the road surface at a position which is away, by a first distance, from the vehicle 1. The light beams that have transmitted through the transmission unit 26b are refracted by the front and rear lens surfaces of the projection lens 27 and projected onto the road surface at a position which is away, by a second distance, from the vehicle 1. The light beams that have transmitted through the transmission unit 26a are refracted by the front and rear lens surfaces of the projection lens 27 and projected onto the road surface at a position which is away, by a third distance, from the vehicle 1. The following is satisfied: first distance>second distance>third distance.

Figure 4:
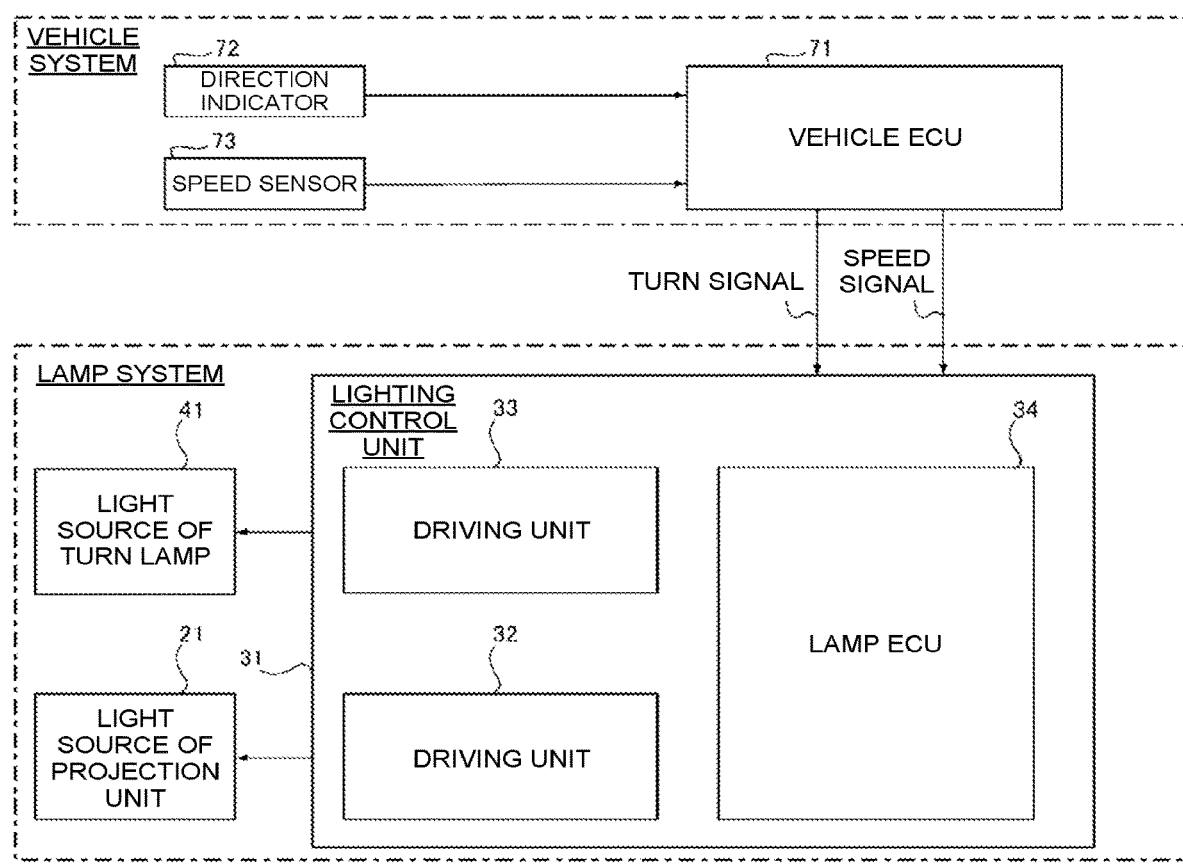
FIG. 4 is a diagram illustrating a schematic configuration of a lighting control unit that performs lighting control of a turn lamp and the projection unit.
Figure 5:
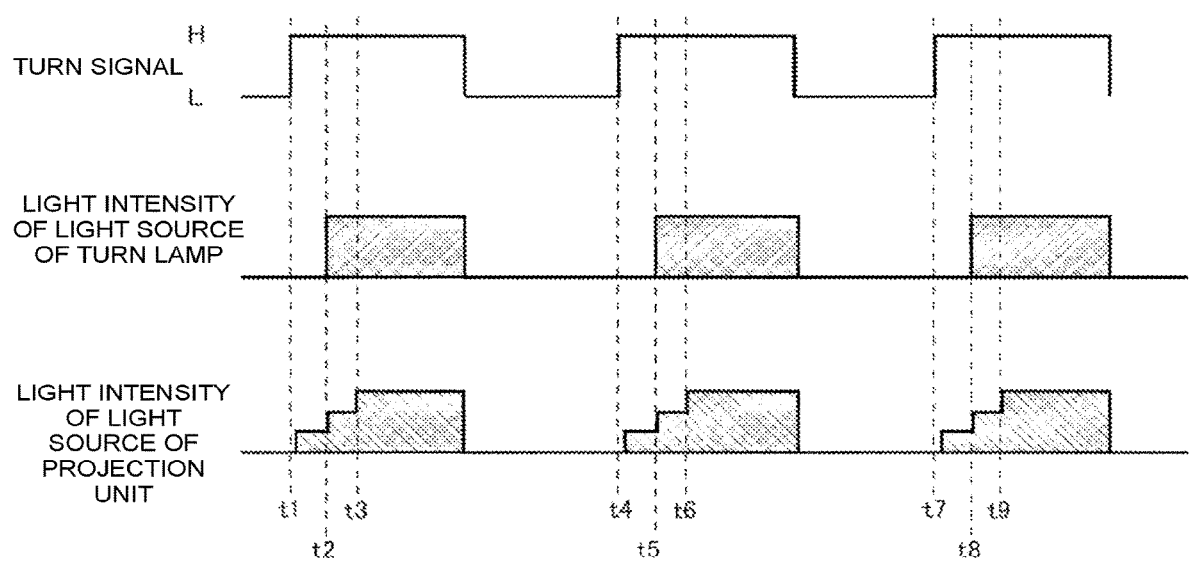
FIG. 5 is a schematic time chart relating to the lighting control of the turn lamp and the projection unit.

The operation of the turn lamp 4c and the projection unit 4d will be described below with reference to FIG. 4 and FIG. 5. When the driver operates the direction indicator 72, the turn signal is inputted from the direction indicator 72 to the lighting control unit 31 directly or through the vehicle ECU 71. As shown in FIG. 5, the lighting control unit 31 turns on a light source 41 of the turn lamp 4c in synchronization with an input of the turn signal (a rising of the turn signal or an H level turn signal). Similarly, the lighting control unit 31 turns on the light source 21 of the projection unit 4d in synchronization with the input of the turn signal. As shown in FIG. 5, the light source 21 of the projection unit 4d is controlled to be turned on earlier than the light source 41 of the turn lamp 4c. This makes it possible alert pedestrians and drivers at a position out of sight of the turn lamp 4c. Of course, the lighting start timing of the turn lamp 4c and the lighting start timing of the projection unit 4d may be substantially the same, or the former may be turned on earlier than the latter. A delay circuit can also be used for adjusting the lighting start timing of the turn lamp and the projection device.

In the present embodiment, the lighting control unit 31 is configured to perform lighting control of the light source 21 of the projection unit 4d such that a required time period from a first time point (a time point t1 in FIG. 5) at which the light source 21 of the projection unit 4d starts lighting in response to the input of the turn signal or the hazard signal to a second time point (a time point t3 in FIG. 5) at which the light source 21 of the projection unit 4d reaches a target light intensity (i.e., a "light intensity increase time period" between the time point t1 and the time point t3 in FIG. 5) ends later than a third time point (a time point t2 in FIG. 5) at which the turn lamp 4c (or the hazard lamp) is lit at a target light intensity thereof in response to the input of the turn signal or the hazard signal. This can increase the possibility that the lighting of the turn lamp 4c is perceived by the surrounding drivers and pedestrians prior to the projection of the image onto the road surface by the projection unit 4d. The role of the turn lamp 4c is better known than the role of the projection unit 4d, so that the driver can smoothly communicate with the surrounding drivers (or pedestrians). Further, the projection unit 4d does not instantaneously transition from the lighting-off state to the lighting-on state at the target light intensity. As described above, the projection unit 4d has the light intensity increase period, that is, the projection unit 4d increases the light intensity stepwise or continuously to reach the target light intensity. This can lessen the impression given to the drivers and pedestrians surrounding the own vehicle that the image (e.g., the arrows 5a to 5c) suddenly appears on the road surface. Note that, in FIG. 5, the turn lamp 4c is turned on at the time point t2. However, the turn lamp 4c may start lighting at the time point t1 or immediately after the time point t1. Typically, the turn lamp 4c instantaneously transitions from the lighting-off state to the lighting at the target light intensity as shown in FIG. 5. However, the turn lamp 4c is not necessarily limited to this configuration. The light source 21 of the projection unit 4d has a time period during which it continues lighting at the target light intensity after the light intensity increase period. Note that the target light intensity can be rephrased as the maximum light intensity.

The light intensity of the light source has a correlation with the current flowing through the light source and is typically proportional to the current. Thus, the features related to the light intensity described above can be described in the same manner in terms of the energization of the light source as follows. The lighting control unit 31 is configured to drive the light source 21 of the projection unit 4d such that a required time period from a first time point (a time point t1 in FIG. 5 or a time point slightly delayed from time point t1) at which supply of the current to the light source 21 of the projection unit 4d is started in response to the input of the turn signal or the hazard signal to a second time point (a time point t3 in FIG. 5) at which the current flowing through the light source 21 of the projection unit 4d reaches a target value (i.e., a "current increase time period" between the time point t1 and the time point t3 in FIG. 5) ends later than a third time point (a time point t2 in FIG. 5) at which the turn lamp 4c (or the hazard lamp) is lit at a target light intensity thereof in response to the input of the turn signal or the hazard signal. Note that the target value of the current can be rephrased as the maximum value of the current.

If the light intensity increase time period and the current increase time period are too long, it may not be possible to ensure a sufficiently long time period in which the light source 21 of the projection unit 4d is lit at the target light intensity due to legal restrictions. From this point of view, the required time period from the time point t1 of the input of the turn signal (or the hazard signal) to the time point t3 at which the light intensity of the light source 21 of the projection unit 4d reaches the target light intensity is advantageously 200 ms or less. That is, the light intensity increase time period and the current increase time period are 200 ms or less. On the other hand, if the light intensity increase time period and the current increase time period are too short, it may become difficult to obtain the above-mentioned effects. Thus, the light intensity increase time period and the current increase time period are advantageously 100 ms or more or 150 ms or more.

The lighting control unit 31 includes a driving unit 32 for driving the light source 21 of the projection unit 4d, a driving unit 33 for driving the light source 41 of the turn lamp 4c, and a lamp ECU 34. The driving units 32 and 33 supply pulse width modulation (PWM) signals to the light sources 21 and 41 to drive them. However, the driving units 32 and 33 are not necessarily limited to this configuration. The lamp ECU 34 controls a driving state of the driving unit 32 and/or the driving unit 33. The lamp ECU 34 can be configured by one or more or a combination of two or more various elements such as a digital circuit, an ASIC (application specific integrated circuit), a CPU (central processing unit), a memory, a bus, and an I/O. A desired control can be executed by causing the CPU to execute a program stored in a memory.

When the turn signal is inputted to the lighting control unit 31, the lighting control unit 31 drives and turns on the light source 41 of the turn lamp 4c. When the turn signal is inputted to the lighting control unit 31, the lighting control unit 31 drives and turns on the light source 21 of the projection unit 4d. In a case where the turn lamp 4c includes a plurality of light sources, the lighting control unit 31 can control the turn lamp 4c to be sequentially turned on (e.g., in the vehicle width direction). The lighting control unit 31 performs lighting control of the light source 21 such that the light intensity of the light source 21 increases stepwise or continuously. In this manner, the illuminance of the image projected onto the road surface from the projection unit 4d increases stepwise or continuously. Creating an effect in which the image gradually appears on the road surface in front of the vehicle 1 makes it possible to gently alert the surrounding pedestrians and drivers. Note that the turn signal can be inputted only to the lamp ECU 34, inputted only to the driving unit 32, or inputted to both the lamp ECU 34 and the driving unit 32.

In FIG. 5, for ease of understanding, the light intensity of the light source 21 of the projection unit 4d is adjusted in three stages. At the time point t1, the turn signal rises to an H level, and with a slight delay the light source 21 emits light of a first light intensity. At the time point t2, the light source 21 emits light of a second light intensity. Further, after the light source 21 starts lighting (not necessarily at the time point t2), the light source 41 of the turn lamp 4c is turned on. At the time point t3, the light source 21 emits light of a third light intensity. The following relationship is satisfied: first light intensity<second light intensity<third light intensity.

In the present embodiment, the required time period from the time point t1 at which the light source 21 starts lighting to the time point t3 at which the light source 21 reaches the target light intensity is shortened as the speed of the vehicle 1 increases. Similarly, the required time period is prolonged as the speed of the vehicle 1 decreases. In this manner, when the vehicle 1 is traveling at a low speed, the arrows 5a to 5c can be gradually brightened up to the target illuminance over a longer period of time to gently alert the surrounding pedestrians and drivers. When the vehicle 1 travels at a high speed, the arrows 5a to 5c can be quickly brightened up to the target illuminance in a shorter period of time to quickly alert the surrounding pedestrians and drivers. As a result, the projection operation of the projection unit 4d can be optimized depending on the traveling speed of the vehicle 1.

Various system configurations (a software control, a digital circuit, a logic circuit, an analog circuit, etc.) can be adopted to implement the above-mentioned control. In some cases, as shown in FIG. 6 and FIG. 7, the lighting control unit 31 changes the duty ratio of the PWM signal at the timing changed according to the speed of the vehicle 1.

Figure 6:
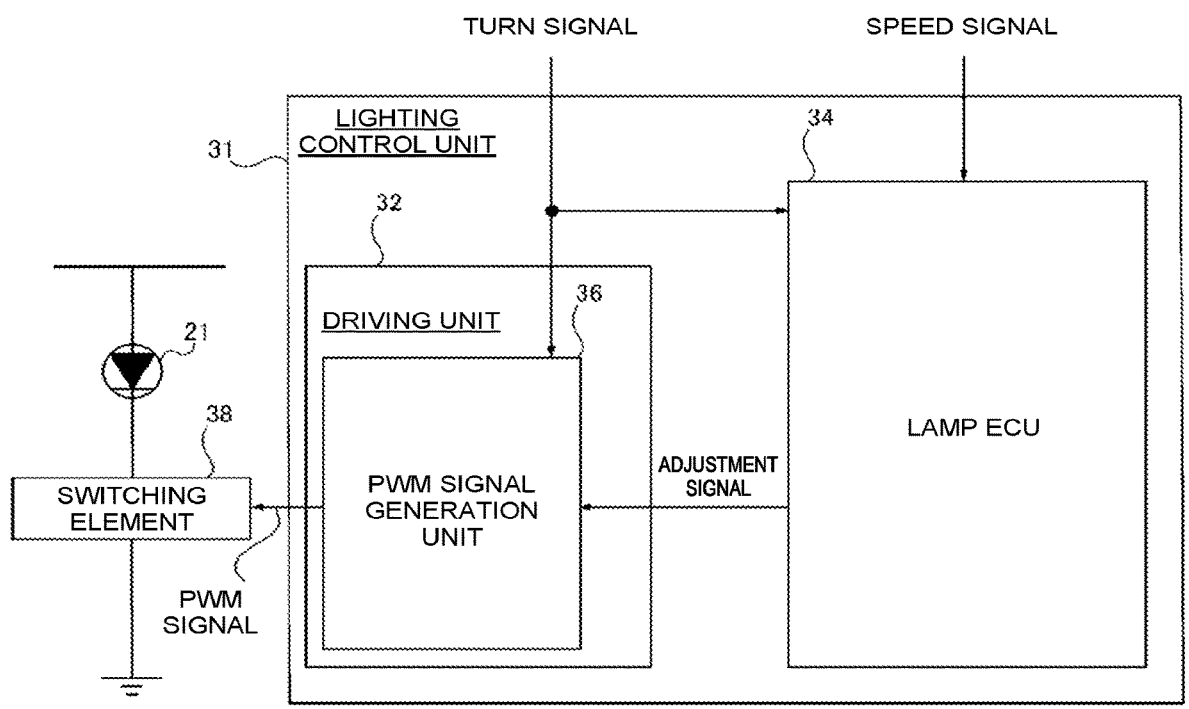
FIG. 6 is a diagram illustrating a non-limiting configuration example of the lighting control unit of the projection device.

As shown in FIG. 6, the driving unit 32 includes a PWM signal generation unit 36 that generates the PWM signal with the predetermined duty ratio. The PWM signal generation unit 36 generates the PWM signal with a first duty ratio in response to the input of the H-level turn signal and supplies the PWM signal to a switching element 38. The PWM signal generation unit 36 generates the PWM signal with the duty ratio different from (typically larger than) the first duty ratio in response to an input of an adjustment signal from the lamp ECU 34 and supplies the PWM signal to the switching element 38. Note that the switching element 38 is, for example, a field effect transistor, and the PWM signal is supplied to a gate terminal of the switching element 38.

Figure 7:
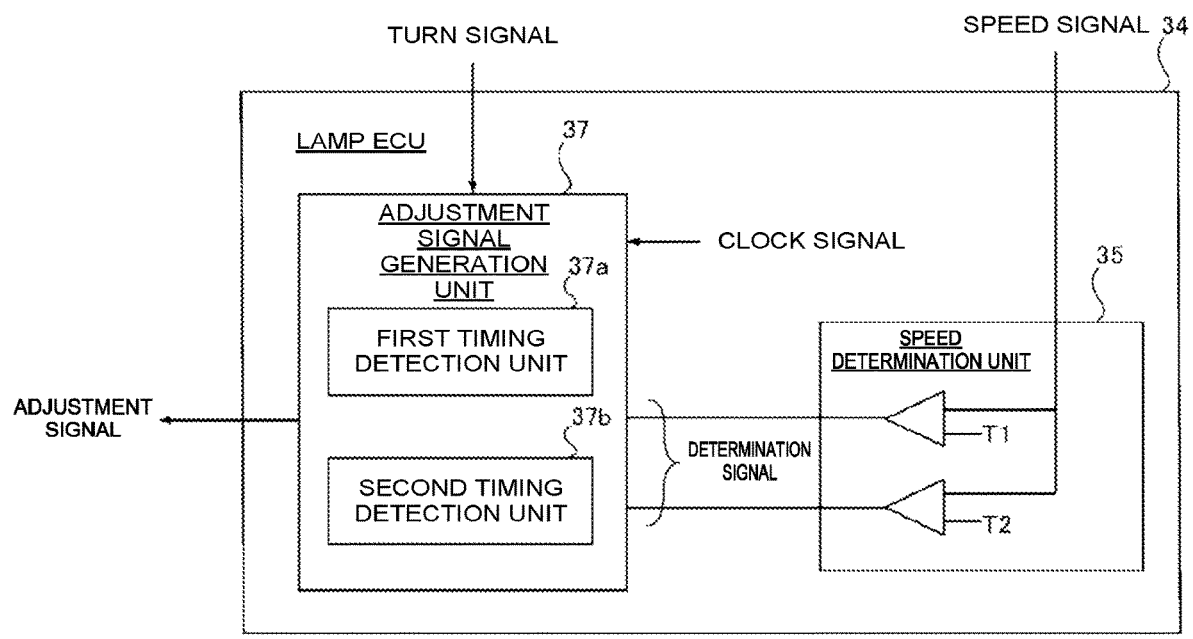
FIG. 7 is a diagram illustrating a non-limiting configuration example of a lamp ECU.

As shown in FIG. 7, the lamp ECU 34 includes a speed determination unit 35 for determining the current speed of the vehicle 1 acquired by the speed sensor 73 of the vehicle 1 and an adjustment signal generation unit 37 that detects a changeable timing according to the determination result of the speed determination unit 35 and generates the adjustment signal. In a mode in which multiple (e.g., two) thresholds T1 and T2 are used for determination of the speed, when the current speed is the threshold T1 or less, the current speed is determined to be low (e.g., a speed of less than 10 km/hour), when the current speed is between the threshold T1 and the threshold T2, the current speed is determined to be medium (e.g., a speed within a range of 10 to 20 km/hour), and when the current speed exceeds the threshold T2, the current speed is determined to be high (e.g., a speed of more than 20 km/hour). A determination signal indicating such a determination result is transmitted from the speed determination unit 35 to the adjustment signal generation unit 37.

The speed determination unit 35 can be implemented by executing a program for comparing the speed value with the threshold in the lamp ECU 34. The use of an analog circuit such as an amplifier is not required. Note that the current speed of the vehicle 1 can be inputted to the lighting control unit 31 (e.g., the lamp ECU 34) in synchronization with the turn signal reaching the H level. The lamp ECU 34 can constantly monitor the current speed of the vehicle 1, and the speed value acquired when the H-level turn signal is inputted can be used for the determination.

The adjustment signal generation unit 37 includes first and second timing detection units 37a and 37b corresponding to two adjustment timings of the light intensity of the light source 21 (see FIG. 5). The first and second timing detection units 37a and 37b detect adjustable timing according to the determination signal. For example, when the determination signal indicates that the vehicle speed is high, the first timing detection unit 37a acquires the rising of the 5th clock counted from the time point at which the turn signal is inputted as a first timing. The second timing detection unit 37b acquires the rising of the 10th clock counted from the time point at which the turn signal is inputted as a second timing. When the determination signal indicates that the vehicle speed is low, the first timing detection unit 37a acquires the rising of the 50th clock counted from the time point at which the turn signal is inputted as the first timing. The second timing detection unit 37b acquires the rising of the 150th clock counted from the time point at which the turn signal is inputted as the second timing. Similarly, when the determination signal indicates that the vehicle speed is medium, the timing can be adjusted by changing the final count clock number. Various other timing circuits can be used instead of the clock counts.

The adjustment timings can be increased by increasing the number of the timing detection units. Further, the clock is any clock of a predetermined frequency, and it can be a clock used in the lamp ECU 34 or a clock provided from the vehicle 1. A dedicated or dual-purpose clock signal generator can also be provided for the timing detection.

When the first timing detection unit 37a acquires the first timing, the adjustment signal generation unit 37 outputs a first adjustment signal for instructing the PWM signal generation unit 36 to increase the duty ratio. Similarly, when the second timing detection unit 37b acquires the second timing, the adjustment signal generation unit 37 outputs a second adjustment signal for instructing the PWM signal generation unit 36 to further increase the duty ratio. The PWM signal generation unit 36 outputs the PWM signal with a second duty ratio to the switching element 38 in response to the first adjustment signal. The PWM signal generation unit 36 outputs the PWM signal with a third duty ratio to the switching element 38 in response to the second adjustment signal. The following relationship is satisfied: first duty ratio<second duty ratio<third duty ratio.

Figure 8:
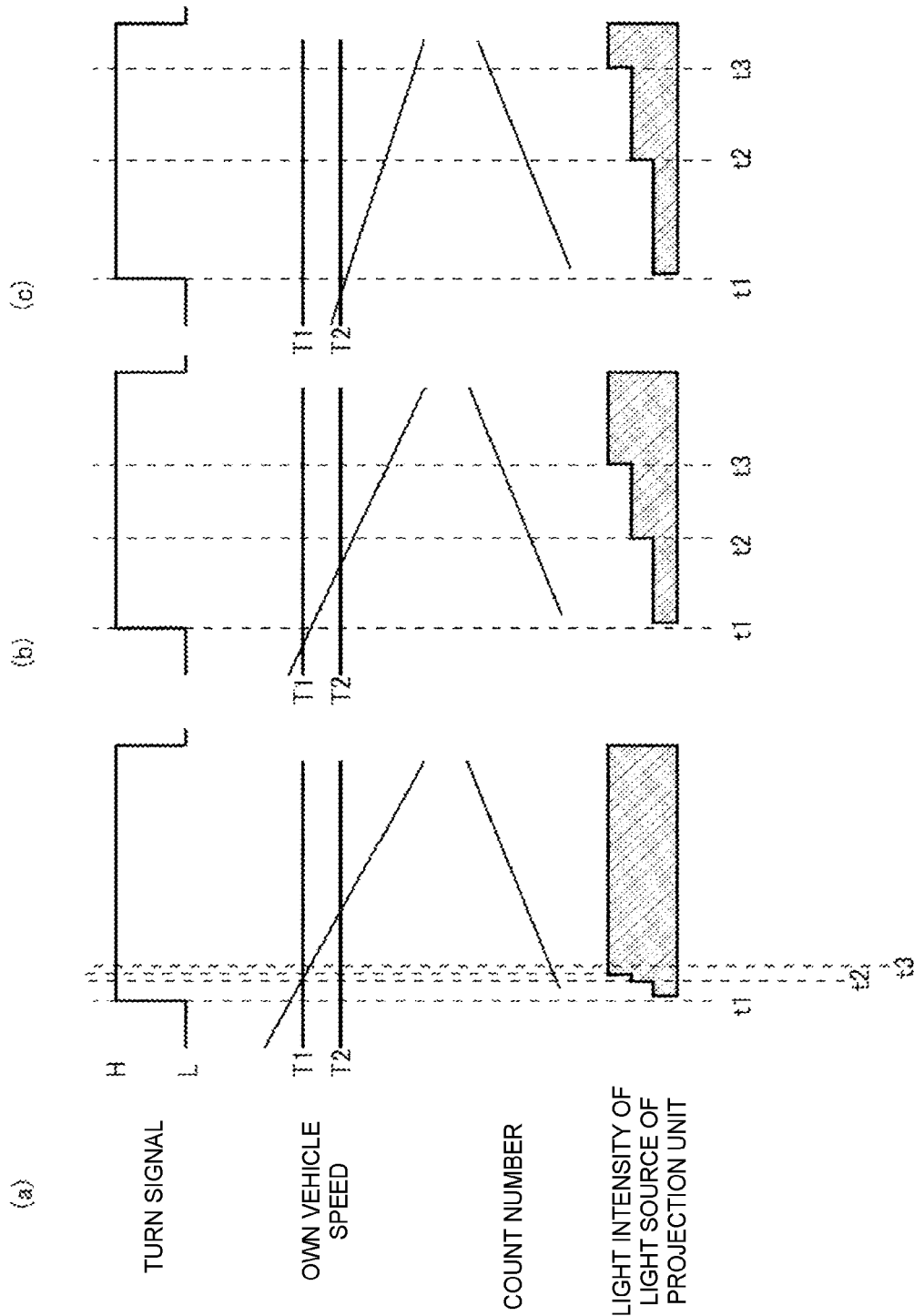
FIG. 8 is a time chart showing that a required time period from a time point at which a light emitting unit of the projection unit starts lighting to a time point at which a target light intensity is reached changes according to an own vehicle speed, where (a) indicates control during high-speed traveling, (b) indicates the control during medium-speed traveling, and (c) indicates the control during low-speed traveling.

Referring to FIG. 8, the lighting control of the light source 21 of the vehicle 1 will be described in a case where the vehicle 1 travels on a first road, enters an intersection of the first road and a second road, and then passes the opposite lane of the first road to enter the second road. In a case shown in FIG. 8(a), when the turn signal reaches the H level, the traveling speed of the vehicle 1 exceeds the threshold T1. In a case shown in FIG. 8(b), when the turn signal reaches the H level, the traveling speed of the vehicle 1 is between the threshold T1 and the threshold T2. In a case shown in FIG. 8(c), when the turn signal reaches the H level, the traveling speed of the vehicle 1 is less than the threshold T2. Thus, the required time period between the time point at which the light source 21 of the projection unit 4d starts lighting and the time point at which the light source 21 reaches the target light intensity becomes longer in the order of FIG. 8(a), FIG. 8(b), and FIG. 8(c).

In FIGS. 8(a) to (c), the turn signal reaches the H level at the time point t1. In response to the input of the H-level turn signal, the lighting control unit 31 instructs the light source 41 of the turn lamp 4c to be turned on, and likewise instructs the light source 21 of the projection unit 4d to be turned on. In order to turn on the light source 21 of the projection unit 4d, the PWM signal generation unit 36 generates the PWM signal with the first duty ratio and supplies the PWM signal to the switching element 38. The switching element 38 periodically repeats on and off states according to the PWM signal, and as a result the light source 21 is lit at the first light intensity. Due to the fast switching period, a time-averaged light intensity is observed. Observation of the light intensity is performed on the optical axis AX of the projection unit 4d.

Note that, in the present specification, the light intensity has the same meaning as the illuminance.

After the H-level turn signal is inputted, the speed of the vehicle 1 is determined by the speed determination unit 35 of the lamp ECU 34. The determination signal indicating this determination result is transmitted from the speed determination unit 35 to the adjustment signal generation unit 37. The adjustment signal generation unit 37 sets the detection timing of the first and second timing detection units 37a and 37b according to the determination signal. In the case of FIG. 8(a), the first and second timing detection units 37a and 37b are set so as to detect the timing with the first and second count numbers. In the case of FIG. 8(b), the first and second timing detection units 37a and 37b are set so as to detect the timing with the third and fourth count numbers. In the case of FIG. 8(c), the first and second timing detection units 37a and 37b are set so as to detect the timing with the fifth and sixth count numbers. The following relationship is satisfied: first count number<second count number<third count number<fourth count number<fifth count number<sixth count number. As a result, as described above, the required time period of FIG. 8(a) becomes minimum. The required time period of FIG. 8(c) becomes maximum. The required time period of FIG. 8(b) is between the required time periods of FIG. 8(a) and FIG. 8(c).

In FIGS. 8(a) to (c), after the time point t1, the adjustment signal generation unit 37 generates the first adjustment signal, and the PWM signal generation unit 36 generates the PWM signal with the second duty ratio. As a result, the light source 21 starts lighting at the second light intensity at the time point t2. After the time point t2, the adjustment signal generation unit 37 generates the second adjustment signal, and the PWM signal generation unit 36 generates the PWM signal with the third duty ratio. As a result, the light source 21 starts lighting at the third light intensity at the time point t3. Projection of the image onto the road surface by the projection unit 4d ends when the turn signal changes from the H level to an L level (i.e., in synchronization with the falling of the turn signal).

As can be understood from the above description, in the present embodiment, the required time period is adjusted in inverse proportion to the speed of the vehicle 1. In this manner, when the vehicle speed is low, a slow road projection effect can be presented, and when the vehicle speed is high, such an effect can be (substantially) omitted. The effect presented at a low speed can gently alert the surrounding pedestrians and drivers. The (substantial) omission of the effect at a high speed can alert the surrounding pedestrians and drivers more quickly, thereby enhancing safety.

Figure 9:
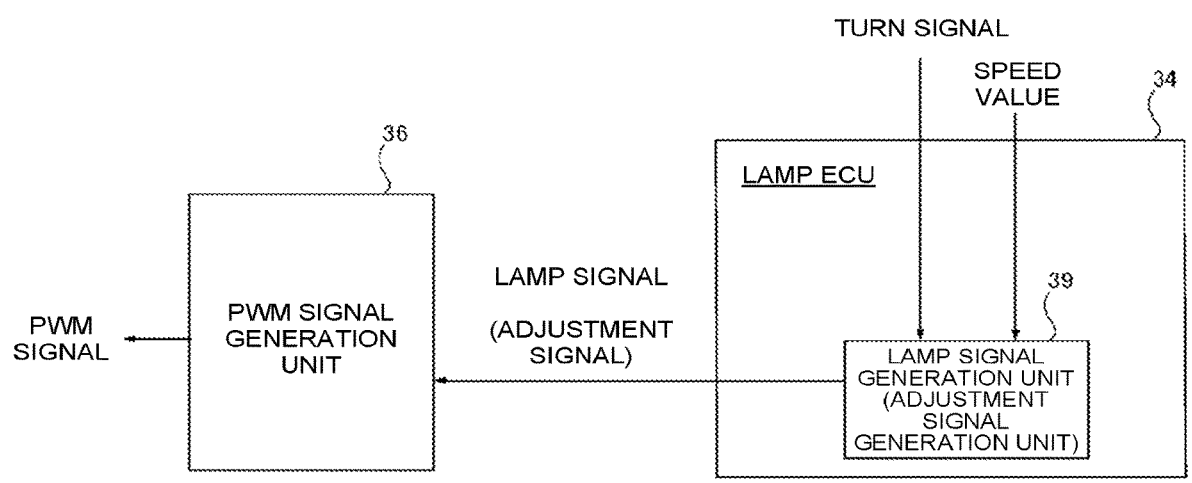
FIG. 9 is a diagram illustrating a schematic configuration of the lamp ECU according to another aspect of the present disclosure.

The lighting control unit 31 can be configured differently to achieve the above goals. As shown in FIG. 9, the lamp ECU 34 includes a lamp signal generation unit 39. The lamp signal generation unit 39 generates a lamp signal in response to the input of the turn signal. The lamp signal means a signal (e.g., a voltage signal or a current signal, or a digital signal) that increases over time. Note that when the lamp signal is not inputted (the lamp signal of L level), the PWM signal generation unit 36 does not generate the PWM signal. The lamp signal generation unit 39 functions as the adjustment signal generation unit, and the lamp signal functions as the adjustment signal.

The lamp signal generation unit 39 generates the lamp signal such that an inclination degree (increase rate) of the lamp signal is proportional to a speed value. That is, the higher the speed value, the larger the inclination degree of the lamp signal. The lower the speed value, the smaller the inclination degree of the lamp signal. The inclination degree of the lamp signal corresponds to a change rate (an increase or decrease rate) of the duty ratio and also corresponds to a change rate (an increase or decrease rate) of the light intensity of the light source 21.

Figure 10:
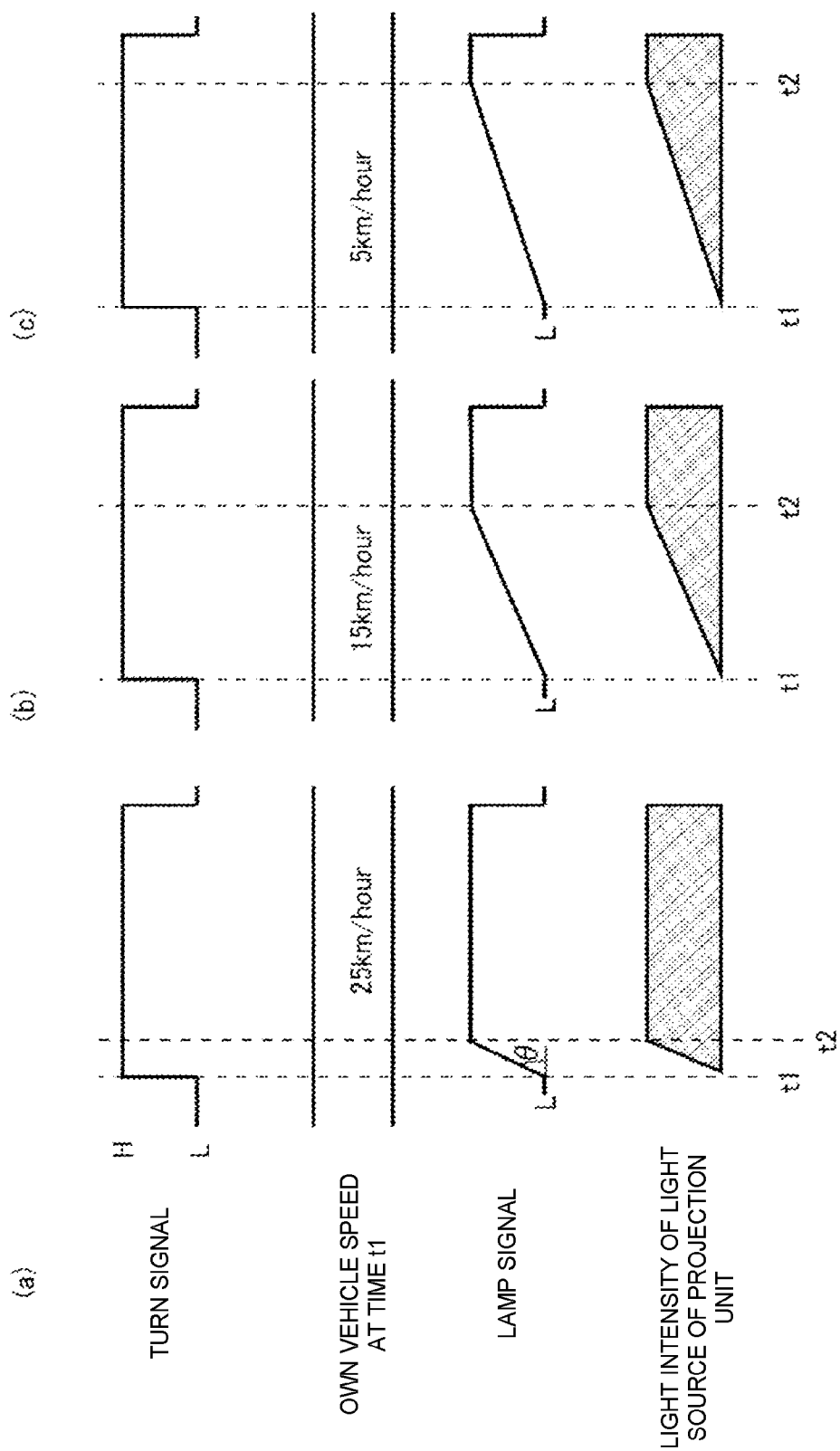
FIG. 10 is a time chart, in relation to FIG. 9, showing that the required time period from the time point at which the light emitting unit of the projection unit starts lighting to the time point at which the target light intensity is reached changes according to the own vehicle speed, where (a) indicates the control during the high-speed traveling, (b) indicates the control during the medium-speed traveling, and (c) indicates the control during the low-speed traveling.

As shown in FIGS. 10(*a*) to (*c*), when the vehicle speed is high (FIG. 10(*a*)), an inclination degree θ of the lamp signal increases, and a time period required for the light source 21 to reach the target light intensity from the start of lighting becomes shorter. When the vehicle speed is low (FIG. 10(*c*)), the inclination degree θ of the lamp signal decreases, and the time period required for the light source 21 to reach the target light intensity from the start of lighting becomes longer. When the vehicle speed is medium (FIG. 10(*b*)), the required time period is between the required time period of FIG. 10(*a*) and the required time period of FIG. 10(*c*). In the same manner as described above, the required time period is adjusted in inverse proportion to the speed of vehicle 1. In this manner, when the vehicle speed is low, a slow road projection effect can be presented, and when the vehicle speed is high, such an effect can be (substantially) omitted. The effect presented at a low speed can gently alert the surrounding pedestrians and drivers. The (substantial) omission of the effect at a high speed can alert the surrounding pedestrians and drivers more quickly, thereby enhancing safety. Note that other values or signals transmitted from the vehicle 1 may be used for adjusting the inclination degree of the lamp signal.

Acquiring the speed of the vehicle 1 without being limited at the time of the input of the H level turn signal makes it possible to achieve the adjustment with higher time resolution. For example, after the lamp signal is generated with a certain inclination degree according to the speed of the vehicle 1 acquired when the turn signal reaches the H level, the speed of the vehicle 1 is acquired at any timing before the light intensity of the light source 21 reaches the target light intensity to update the inclination degree of the lamp signal. This allows the lamp signal and the light intensity of the light source 21 to be adjusted by two or more inclination degrees. The same adjustment can be performed by determining the speed using the threshold. For example, when the speed is re-evaluated at the time point t2 in FIG. 8(*b*) and turns out to be less than the threshold T2, the timing of the time point t3 can be delayed as shown in FIG. 8(*c*).

Figure 11:
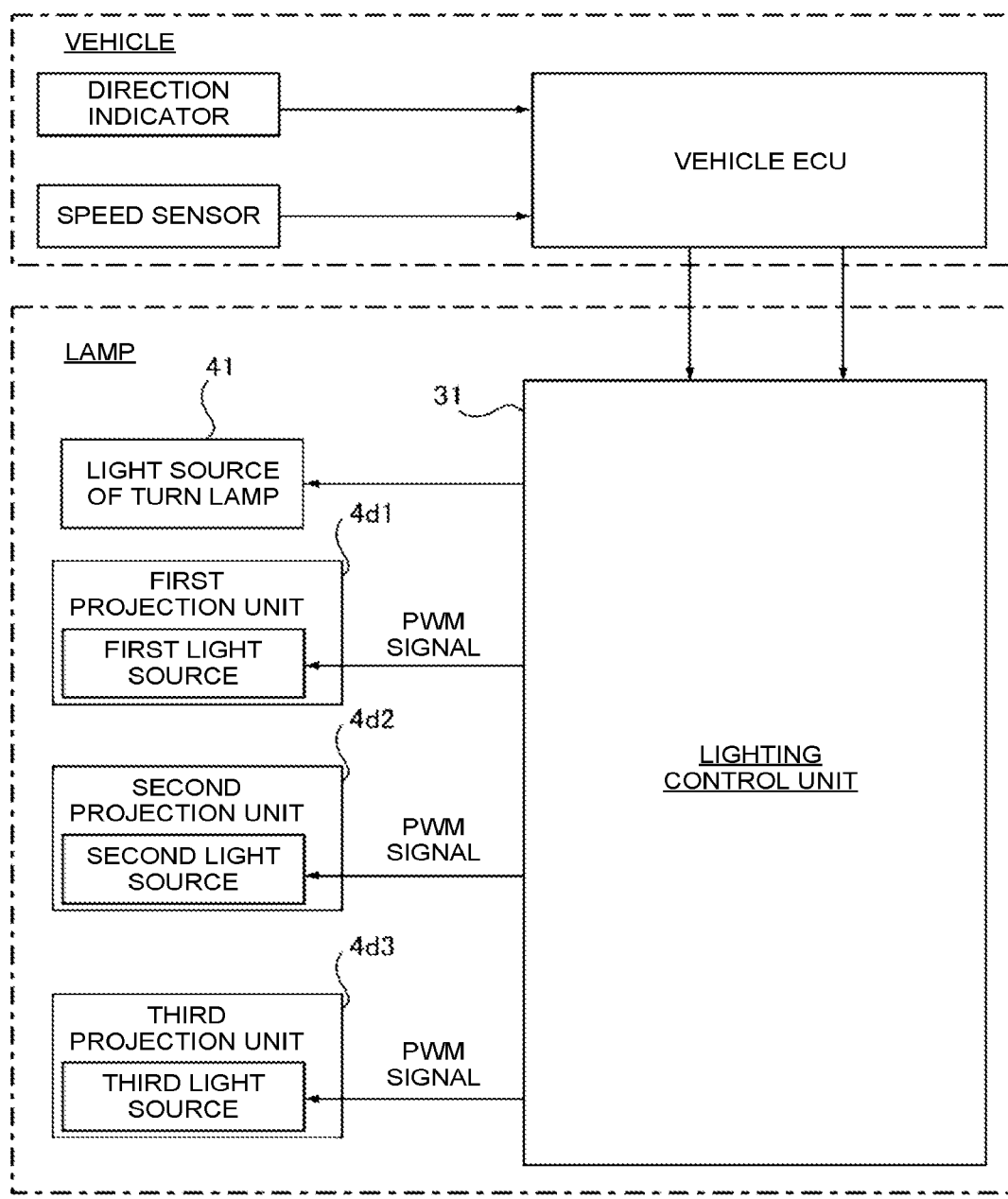
FIG. 11 is a diagram illustrating a schematic system configuration of the turn lamp and the projection units according to another aspect of the present disclosure, in which three projection units are provided.
Figure 12:
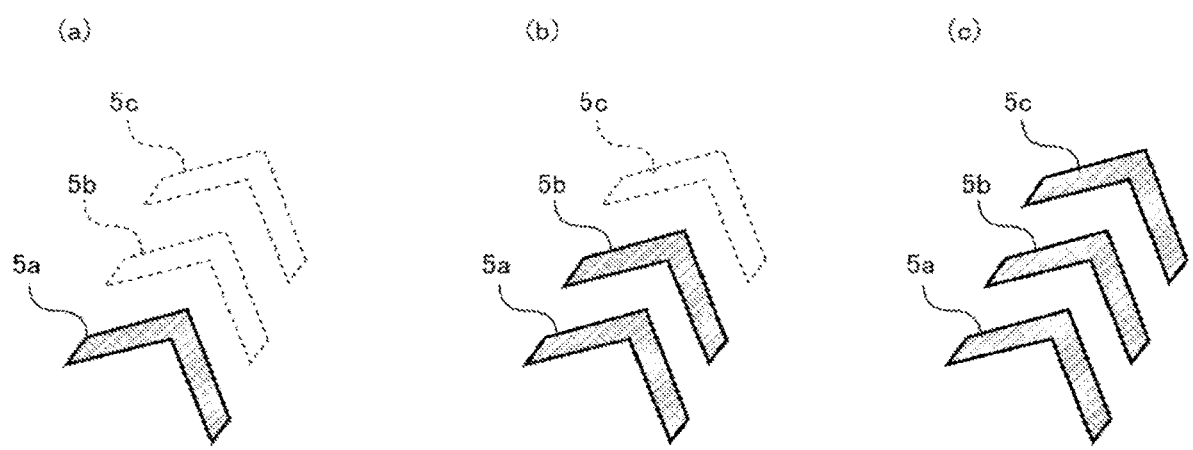
FIG. 12 is a schematic diagram illustrating that a plurality of mutually distinguishable sub-regions of a predetermined image are lit sequentially.

Application examples of the above-mentioned embodiments will be described with reference to FIG. 11 to FIG. 13. As shown in FIG. 11, first to third projection units 4*d*1 to 4*d*3 are provided as the projection unit 4*d*. Each of the first to third projection units 4*d*1 to 4*d*3 is an individual module as shown in FIG. 3. The first projection unit 4*d*1 is controlled so as to project an arrow 5*a* shown in FIG. 12 onto the road surface. The second projection unit 4*d*2 is controlled so as to project an arrow 5*b* shown in FIG. 12 onto the road surface. The third projection unit 4*d*3 is controlled so as to project an arrow 5*c* shown in FIG. 12 onto the road surface. The arrows 5*a* to 5*c* are sub-regions of a predetermined image (see FIG. 12(*c*)) made up of these combinations.

Figure 13:
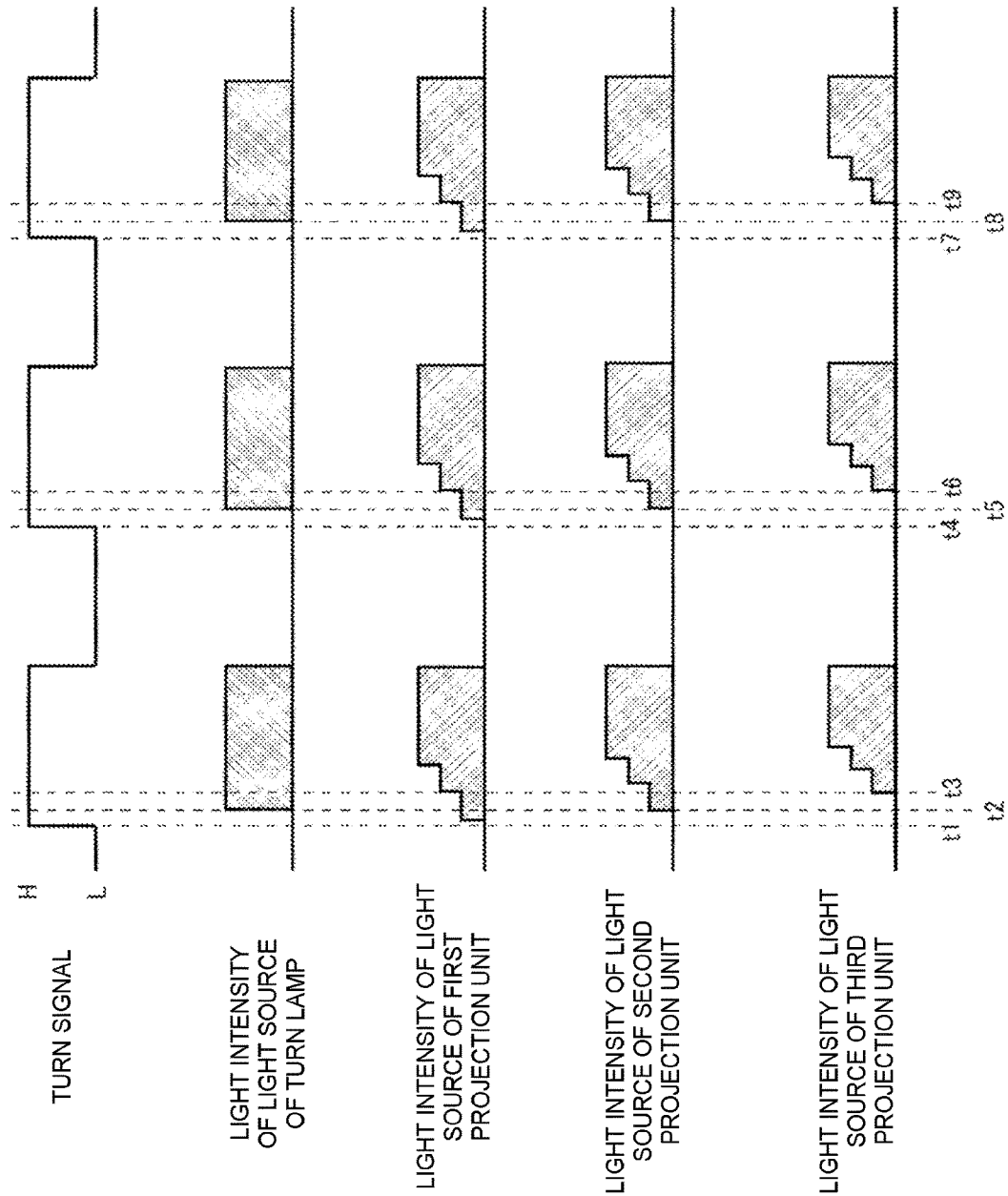
FIG. 13 is a time chart showing sequential control of the projection units.

As shown in FIG. 13, in response to the input of the H-level turn signal at the time point t1, the lighting control unit 31 supplies the PWM signal to a first light source of the first projection unit 4*d*1, thereby causing the first light source to start lighting. The lighting control unit 31 supplies the PWM signal to a second light source of the second projection unit 4*d*2 at the time point t2 at which a first time has passed since the time point t1 of the input of the H-level turn signal, thereby causing the second light source to start lighting. Further, the lighting control unit 31 supplies the PWM signal to the light source 41 of the turn lamp 4*c*, thereby causing the light source 41 to start lighting. The lighting control unit 31 supplies the PWM signal to a third light source of the third projection unit 4*d*3 at the time point t3 at which a second time has passed since the time point t1 of the input of the H-level turn signal, thereby causing the third light source to start lighting. The lighting control unit 31 can sequentially turn on the first to third projection units 4*d*1 to 4*d*3 by referring to a timer. However, it is also possible to achieve the sequential lighting by inserting a delay circuit.

As described above, the required time period is adjusted in inverse proportion to the speed of the vehicle 1, and the same control is performed for the light sources of the first to third projection units 4*d*1 to 4*d*3.

Figure 14:
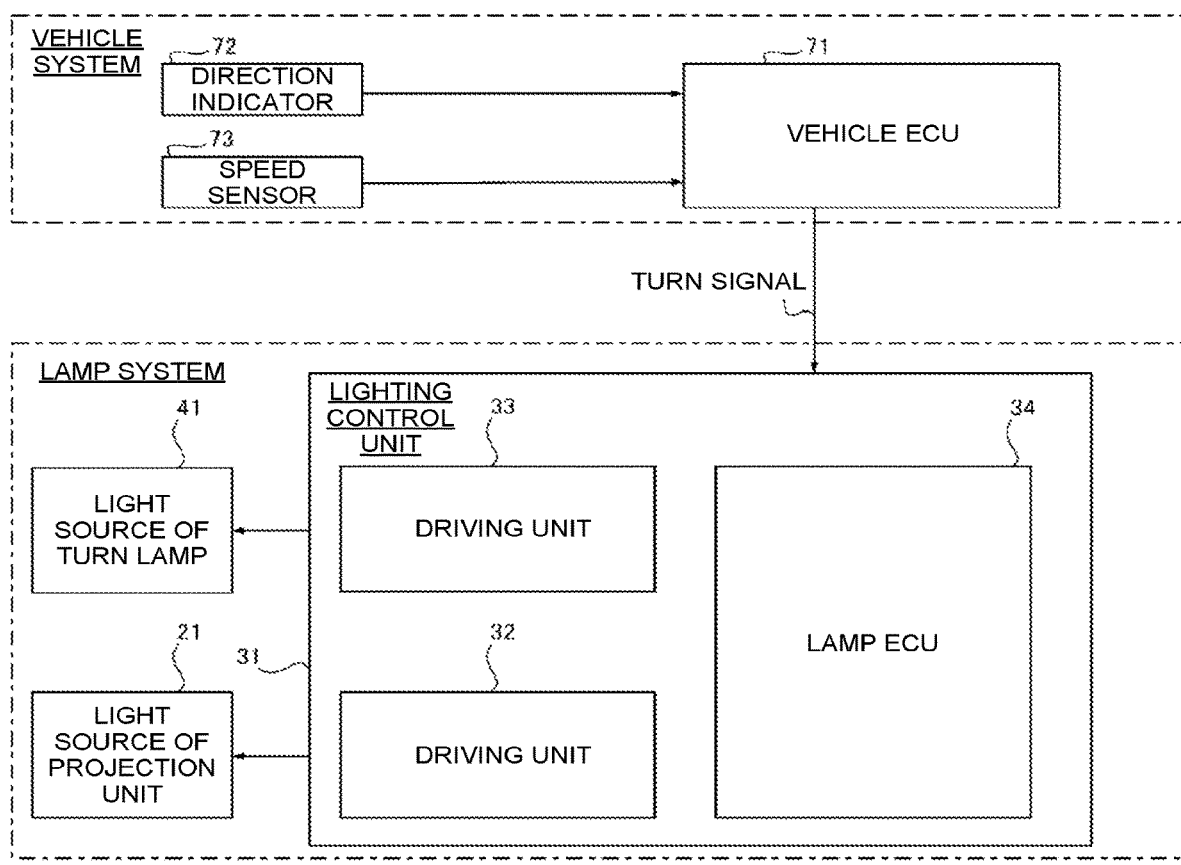
FIG. 14 is diagram illustrating a schematic configuration of the lighting control unit that performs the lighting control of the turn lamp and the projection unit according to another aspect.
Figure 15:
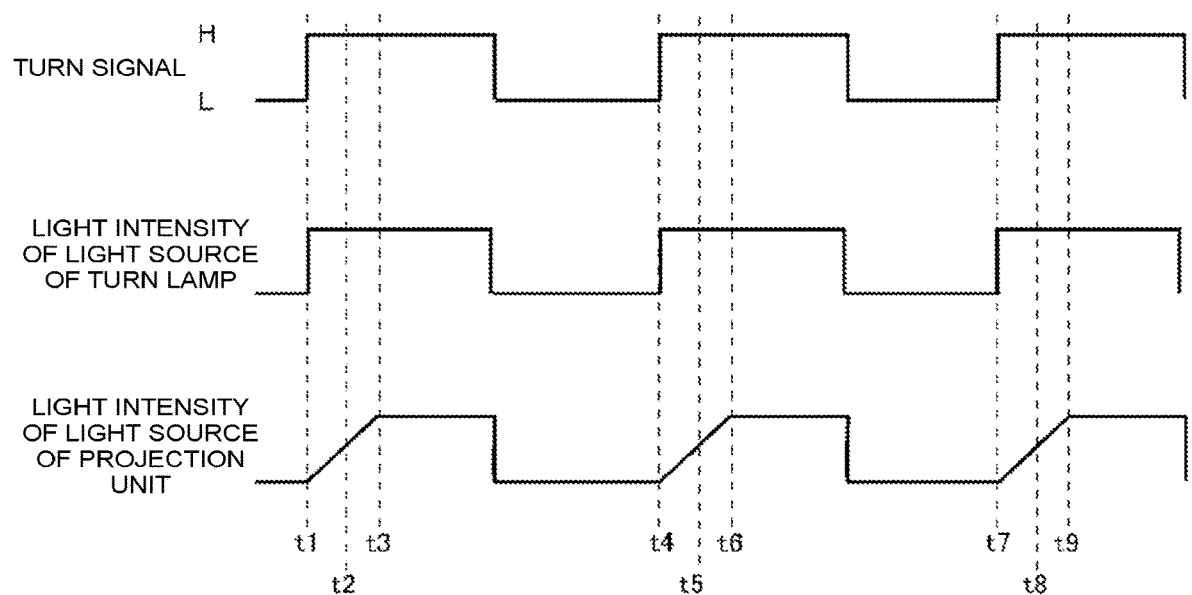
FIG. 15 is a schematic time chart relating to the lighting control of the turn lamp and the projection unit according to another aspect.

As shown in FIG. 14, there may be a mode where the lighting control unit 31 of the lamp system receives the turn signal (or the hazard signal) from the vehicle side (e.g., the vehicle ECU 71), but does not receive the speed signal. Even in such a case, the features described with reference to FIG. 5 are effective. That is, referring to FIG. 15 corresponding to FIG. 5, in the same manner as described above, this mode can be described as follows. The lighting control unit 31 is configured to perform the lighting control of the light source 21 of the projection unit 4*d* such that a required time period from a first time point (a time point t1 in FIG. 15 or a time point slightly delayed from the time point t1) at which the light source 21 of the projection unit 4*d* starts lighting in response to the input of the turn signal to a second time point (a time point t3 in FIG. 15) at which the light source 21 of the projection unit 4*d* reaches the target light intensity (a time period between the time point t1 and the time point t3 in FIG. 15) ends later than a third time point (the time point t1 in FIG. 15 or the time point slightly delayed from the time point t1) at which the turn lamp 4*c* is lit at the target light intensity thereof in response to the input of the turn signal. Similarly, the lighting control unit 31 is configured to drive the light source 21 of the projection unit 4*d* such that a required time period from a first time point (a time point t1 in FIG. 15 or a time point slightly delayed from the time point t1) at which supply of the current to the light source 21 of the projection unit 4*d* is started in response to the input of the turn signal to a second time point (a time point t3 in FIG. 15) at which the current flowing through the light source 21 of the projection unit 4*d* reaches the target value (i.e., a "current increase time period" between the time point t1 and the time point t3 in FIG. 15) ends later than a third time point (a time point t2 in FIG. 15) at which the turn lamp 4*c* is lit at the target light intensity thereof in response to the input of the turn signal. Note that the turn signal can be rephrased as the hazard signal, and the turn lamp can be rephrased as the hazard lamp. Advantageously, the light intensity increase time period and the current increase time period are 200 ms or less. More preferably, the light intensity increase time period and the current increase time period are 100 ms or more or 150 ms or more, and 200 ms or less.

Figure 16:
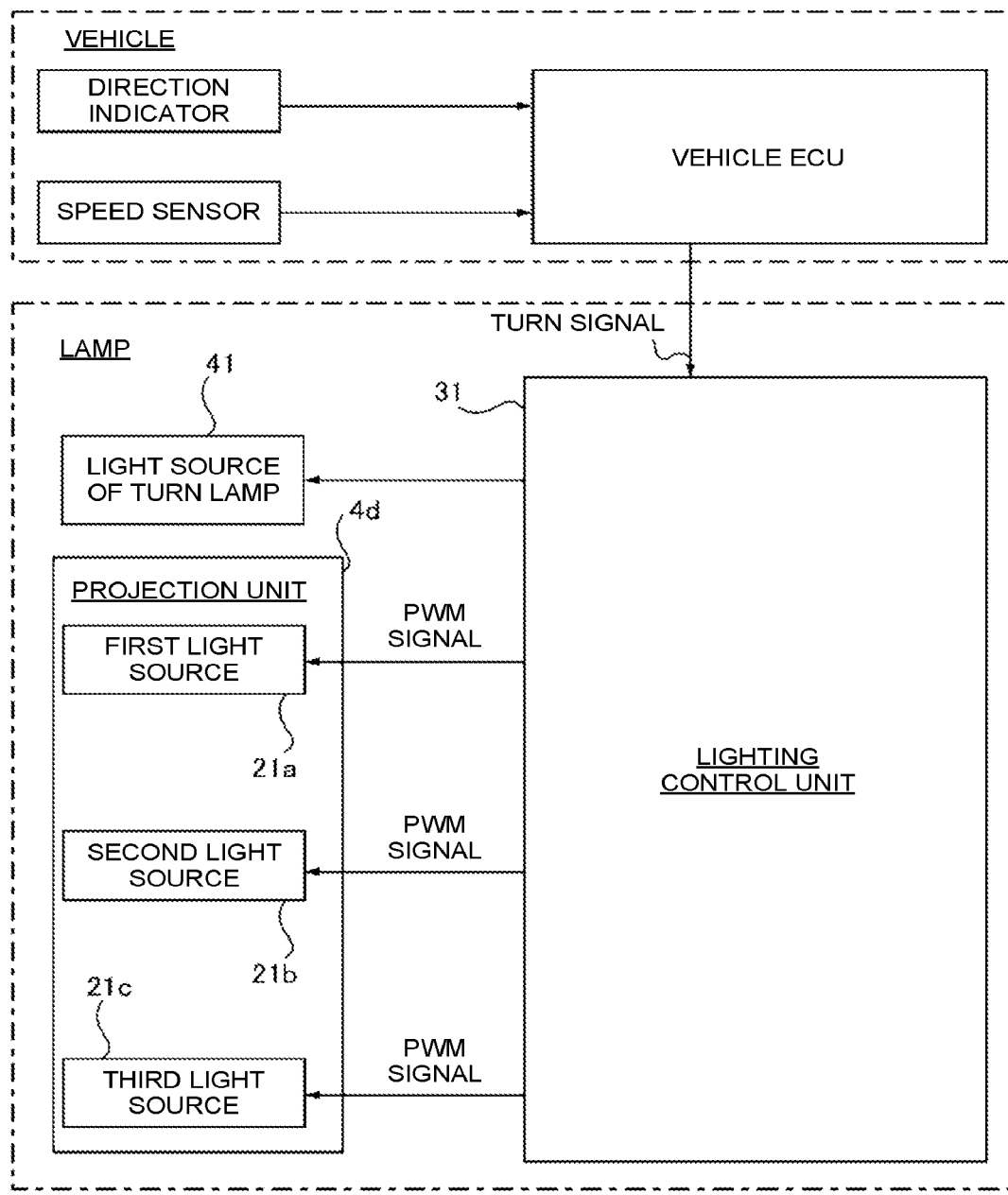
FIG. 16 is a diagram illustrating a schematic system configuration of the turn lamp and the projection units according to still another aspect, in which three projection units are provided.
Figure 17:
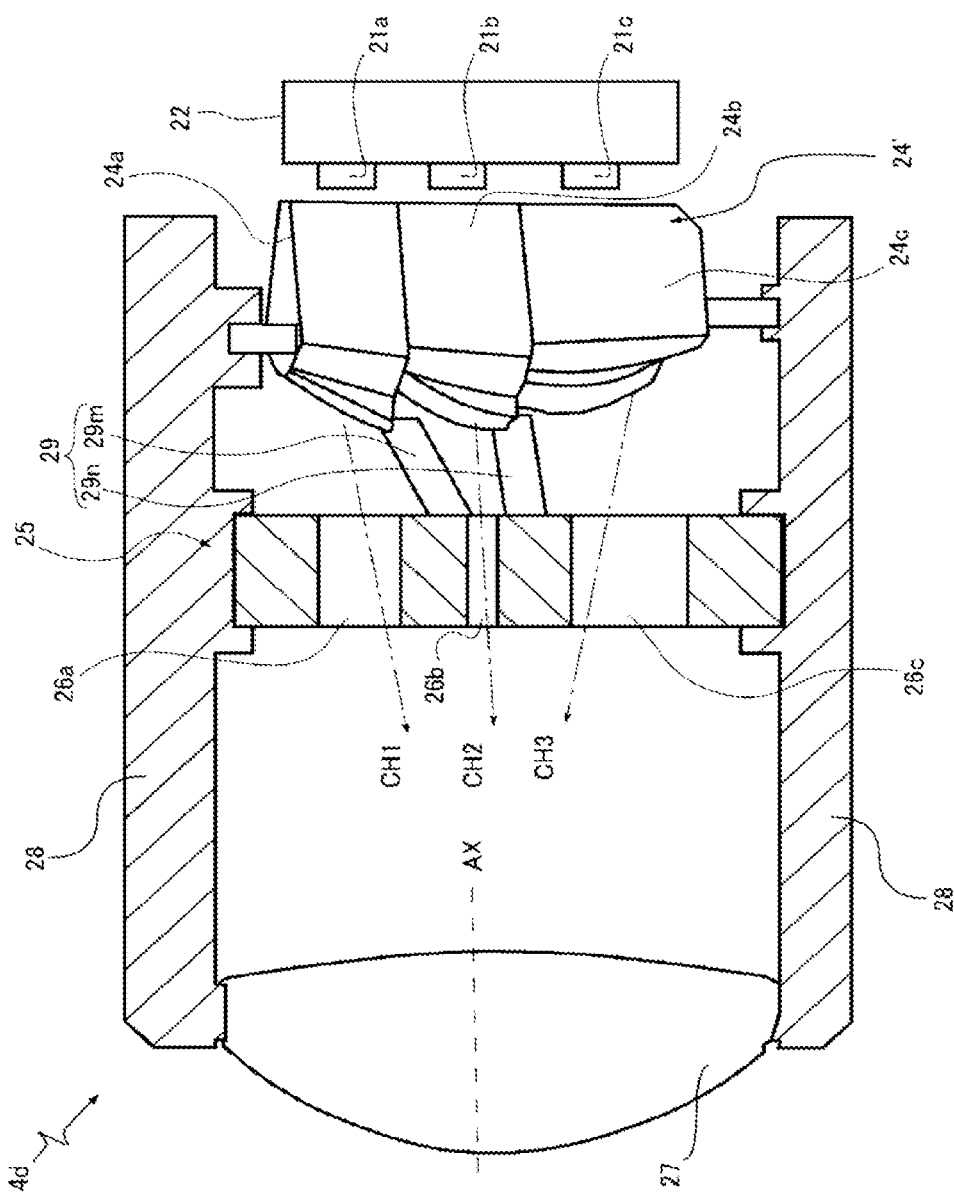
FIG. 17 is a schematic diagram of the projection units of the projection device according to one aspect of the present disclosure.

As shown in FIG. 16 and FIG. 17, there may be a mode where the projection unit 4*d* is adapted to sequential lighting. The predetermined image projected onto the road surface by the projection unit 4*d* includes a plurality of sub-regions (e.g., the arrows 5*a* to 5*c*). The projection unit 4*d* includes a plurality of light sources (e.g., one or more semiconductor light emitting elements such as LEDs and LDs) 21*a* to 21*c* provided for individual projection of the plurality of sub-regions. Note that the number of the sub-regions in the predetermined image and the number of the light sources are not limited to three, and may be four, five, or six or more.

As can be understood from FIG. 17, a common optical system and housing can be adopted for the plurality of light sources in order to reduce the size of the projection unit 4d. As an alternative to the light source 21 in FIG. 3, three light sources 21a to 21c are provided. Further, as an alternative to the condenser lens 24 in FIG. 3, a lens 24' including lens units 24a to 24c adapted for individual control of light emitted from the three light sources 21a to 21c is provided. Further, a light shielding plate 29 is provided between the lens 24' and the light shielding member 25 to prevent crosstalk between channels. A channel CH1 for the light emitted from the light source 21a and a channel CH2 for the light emitted from the light source 21b are optically separated by a light shielding plate 29m, and the channel CH2 for the light emitted from the light source 21b and a channel CH3 for the light emitted from the light source 21c are optically separated by a light shielding plate 29n.

Figure 18:
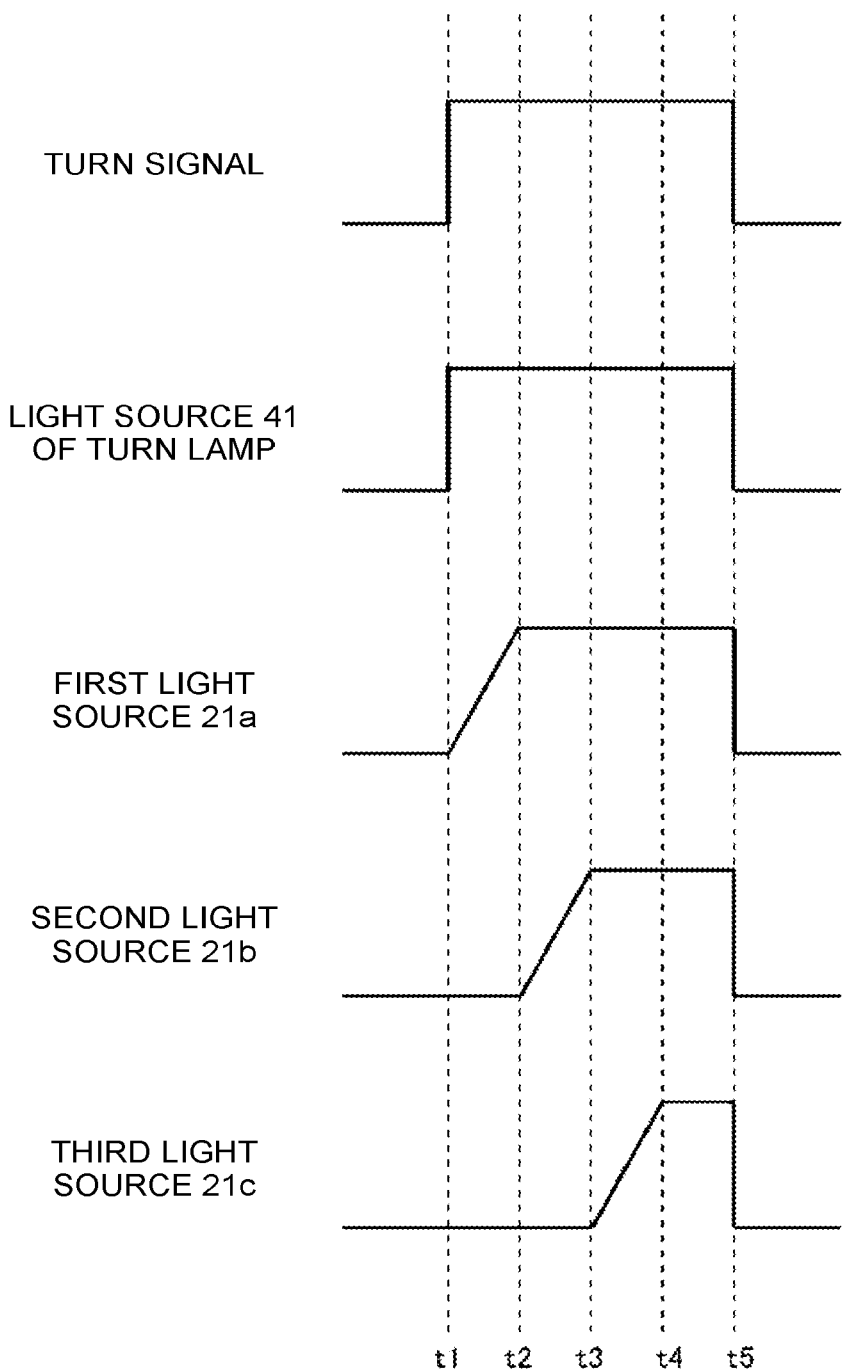
FIG. 18 is a time chart relating to the lighting control of the turn lamp and the projection units.

The operation of the lighting control unit 31 shown in FIG. 16 will be described with reference to FIG. 18. The lighting control unit 31 receives the turn signal at a time point t1 and immediately instructs the light source 41 of the turn lamp 4c to be turned on. For example, the lighting control unit 31 supplies a lighting signal (e.g., a high-level pulse signal) to a switch (e.g., connected in series) that determines the energized state of the light source 41 of the turn lamp 4c. In response to this, the switch is turned on and the light source 41 lights up. When the switch is turned on, a direct current or alternating current flows through the light source 41, or a direct voltage or alternating voltage is applied to the light source 41, causing the light source 41 to light up. The light source 41 reaches the target light intensity immediately after (almost at the same time as) the switch is turned on. Accordingly, FIG. 18 shows that the light source 41 reaches the target light intensity at the time point t1. Lighting of the light source 41 at the target light intensity continues until a time point t5 at which the turn signal changes to the L level.

In parallel with the lighting control of the light source 41 of the turn lamp 4c in response to the turn signal described above, the lighting control unit 31 also starts the lighting control of the first light source 21a (e.g., the light source 21a shown in FIG. 17) of the projection unit 4d in response to the turn signal. Specifically, the lighting control unit 31 supplies the PWM signal to a switch (e.g., connected in series) that determines the energized state of the first light source 21a of the projection unit 4d. Increasing the duty ratio of the PWM signal stepwise or continuously can increase the light intensity of the first light source 21a stepwise or linearly. In FIG. 18, the light intensity of the first light source 21a increases linearly until a time point t2 and reaches the target light intensity at the time point t2. Lighting of the first light source 21a at the target light intensity continues until the time point t5 at which the turn signal changes to the L level.

The lighting control unit 31 starts the lighting control of the second light source 21b (e.g., the light source 21b shown in FIG. 17) of the projection unit 4d at the time point t2 after a predetermined time has passed since the time point t1. For example, the lighting control unit 31 supplies the PWM signal to the switch (e.g., connected in series) that determines the energized state of the second light source 21b of the projection unit 4d. Increasing the duty ratio of the PWM signal stepwise or continuously can increase the light intensity of the second light source 21b stepwise or linearly. In FIG. 18, the light intensity of the second light source 21b increases linearly until a time point t3 and reaches the target light intensity at the time point t3. Lighting of the second light source at the target light intensity continues until the time point t5 at which the turn signal changes to the L level.

The lighting control unit 31 starts the lighting control of the third light source 21c (e.g., the light source 21c shown in FIG. 17) of the projection unit 4d at the time point t3 after a predetermined time has passed since the time point t1. For example, the lighting control unit 31 supplies the PWM signal to the switch (e.g., connected in series) that determines the energized state of the third light source 21c of the projection unit 4d. Increasing the duty ratio of the PWM signal stepwise or continuously can increase the light intensity of the third light source linearly. In FIG. 18, the light intensity of the third light source 21c increases linearly until a time point t4 and reaches the target light intensity at the time point t4. Lighting of the third light source 21c at the target light intensity continues until the time point t5 at which the turn signal changes to the L level.

In all the first to third light sources of the projection unit 4d, the required time period from the lighting start time point to the time point at which the target light intensity is reached ends later than the time point at which the turn lamp 4c is lit at the target light intensity in response to the input of the turn signal or the hazard signal (the time point t1 in FIG. 18 or a time point slightly delayed from the time point t1). In this manner, the same effects as those described with reference to FIG. 5 and FIG. 15 can be obtained.

A time interval between the time point t1 of the input of the turn signal and the time point t4 at which the light intensity of the light source 21c that finally starts lighting in the projection unit 4d reaches the target light intensity thereof can be 200 ms or less. In this manner, the state in which all the light sources 21a to 21c of the projection unit 4d are fully lit can be maintained for a desired period of time, making it possible to more sufficiently alert the drivers and pedestrians surrounding the own vehicle. Advantageously, the time interval between the time point t1 of the input of the turn signal and the time point t4 at which the light intensity of the light source 21c that finally starts lighting in the projection unit 4d reaches the target light intensity thereof is 100 ms or more or 150 ms or more.

Without being necessarily limited to this configuration, the time interval between the time point t1 and the time point t2, the time interval between the time point t2 and the time point t3, the time interval between the time point t3 and the time point t4, and the time interval between the time point t4 and the time point t5 are equal. In this case, the first to third light sources have the light intensity increase time period (also the current increase time period) of equal time length. This makes it possible to obtain a visual effect in which individual images (e.g., the arrows 5a to 5c) gradually appear on the road surface in the same manner.

Without being necessarily limited to this configuration, the change rate of the light intensity of the first light source 21a (in other words, the change rate of the current flowing through the first light source) during the required time period for the first light source 21a (the time period between the time point t1 and the time point t2), the change rate of the light intensity of the second light source 21b (in other words, the change rate of the current flowing through the second light source) during the required time period for the second light source 21b (the time period between the time point t2 and the time point t3), and the change rate of the light intensity of the third light source 21c (in other words, the change rate of the current flowing through the third light source) during the required time period for the third light source 21c (the time period between the time point t3 and the time point t4) are equal. This makes it possible to obtain a visual effect in which individual images (e.g., the arrows 5a to 5c) gradually appear on the road surface in the same manner.

Figure 19:
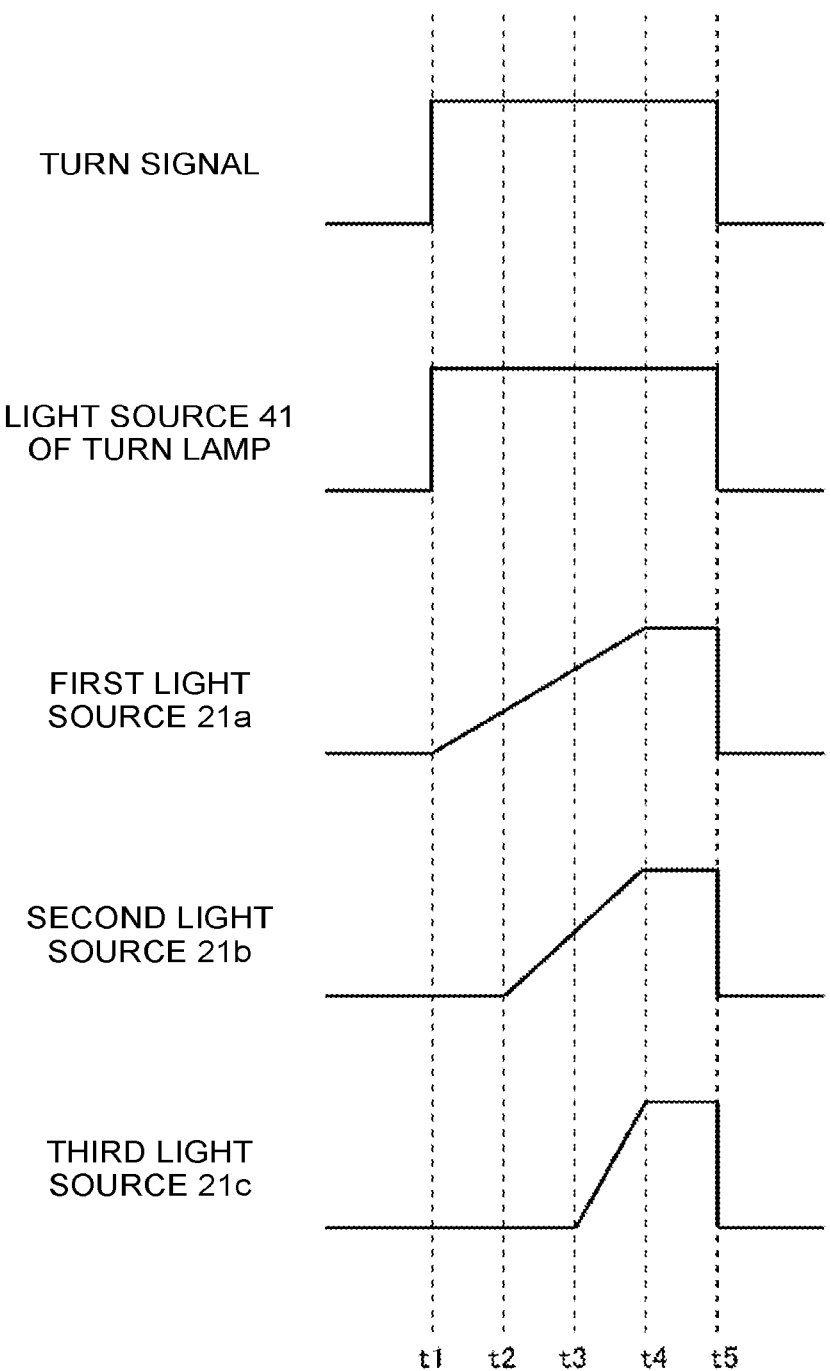
FIG. 19 is a time chart relating to the lighting control of the turn lamp and the projection units.

In the case shown in FIG. 19, the lighting control unit 31 performs the lighting control of the light sources 21a to 21c such that the plurality of light sources 21a to 21c simultaneously reach the target light intensity. Since the lighting start time points of the light sources 21a to 21c are different, the light sources 21a to 21c have the required time periods of different time length and have different increase rates (along the time axis) of the light intensity of the light sources. In FIG. 19, the light intensity increase rate of the first light source 21a that starts lighting at the time point t1 has the minimum value (i.e., the light intensity changes most slowly along the time axis), the light intensity increase rate of the second light source 21b that starts lighting at the time point t2 has an intermediate value (i.e., the light intensity changes by an intermediate degree along the time axis), and the light intensity increase rate of the third light source 21c that starts lighting at the time point t3 has the maximum value (i.e., the light intensity changes most quickly along the time axis). In this manner, the first to third light sources 21a to 21c simultaneously reach the target light intensity at the time point t4. Although the time period in which all the light sources 21a to 21c of the projection unit 4d are fully lit (the time period between the time point t4 and the time point t5) is shortened, the lighting of the turn lamp 4c can be made conspicuous as compared with the lighting of the projection unit 4d. Note that the first to third light sources 21a to 21c are simultaneously turned off in response to the transition of the turn signal to the L level in the same manner as described above.

Based on the above description, those skilled in the art can make various modifications to each embodiment. The hazard signal can be used in addition to or in place of the turn signal. The projection unit can be provided in a different location or light chamber than the low beam lamp and the high beam lamp. The lamp ECU can be understood as an adjustment unit that adjusts the light intensity or the duty ratio.

DESCRIPTION OF REFERENCE NUMERALS

4d Projection unit
21 Light source
31 Lighting control unit

The invention claimed is:

1. A vehicle projection device comprising:
a projection unit that includes a light source and projects a predetermined image onto a road surface based on lighting of the light source; and
a lighting control unit that performs lighting control of at least the light source of the projection unit, wherein:
the lighting control unit performs the lighting control of the light source of the projection unit such that a required time period from a first time point at which the light source of the projection unit starts lighting in response to an input of a turn signal or a hazard signal to a second time point at which the light source of the projection unit reaches a target light intensity ends later than a third time point at which a turn lamp or a hazard lamp is lit at a target light intensity of the turn lamp or the hazard lamp in response to the input of the turn signal or the hazard signal, and
the lighting control unit performs the lighting control of the light source such that the required time period is shortened as a speed of an own vehicle increases.

2. The vehicle projection device according to claim 1, wherein the required time period is 200 ms or less.

3. The vehicle projection device according to claim 2, wherein:
the predetermined image includes a plurality of sub-regions, and the projection unit includes a plurality of light sources provided for individual projection of the plurality of sub-regions, and
the lighting control unit (i) starts lighting of the plurality of light sources in a predetermined order in response to the input of the turn signal or the hazard signal and (ii) performs the lighting control of the plurality of light sources such that the required time period of each light source of the plurality of light sources ends later than the third time point.

4. The vehicle projection device according to claim 3, wherein the lighting control unit performs the lighting control of the plurality of light sources such that the required time period of each light source of the plurality of light sources has the same time length.

5. The vehicle projection device according to claim 3, wherein the lighting control unit performs the lighting control of the plurality of light sources such that the required time period of each light source of the plurality of light sources has a different time length.

6. The vehicle projection device according to claim 3, wherein the lighting control unit performs the lighting control of the plurality of light sources such that the plurality of light sources reach the target light intensity at the same time and/or the plurality of light sources are turned off at the same time.

7. The vehicle projection device according to claim 3, wherein the lighting control unit generates a plurality of pulse width modulation (PWM) signals for individual lighting control of the plurality of light sources.

8. The vehicle projection device according to claim 1, wherein the lighting control unit performs the lighting control of the light source such that the light source has the continuously changing light intensity during the required time period.

9. The vehicle projection device according to claim 1, wherein the lighting control unit performs the lighting control of the light source such that the required time period is prolonged as a speed of the own vehicle decreases.

10. The vehicle projection device according to claim 1, wherein the lighting control unit stepwise or continuously adjusts a duty ratio of a pulse width modulation (PWM) signal during the required time period inversely proportional to the speed of the own vehicle.

11. The vehicle projection device according to claim 1, wherein the speed of the own vehicle referred to for adjusting the required time period is acquired in synchronization with a rising of the turn signal or the hazard signal.

12. The vehicle projection device according to claim 1, wherein:
the predetermined image includes a plurality of mutually distinguishable sub-regions; and
the projection unit is controlled so as to sequentially project the plurality of sub-regions onto the road surface in synchronization with the turn signal or the hazard signal.

13. The vehicle projection device according to claim 1, wherein the projection unit further includes:
- a light shielding member provided with a plurality of transmission units that selectively transmit light emitted from the light source; and
- a condenser lens that is disposed between the light source and the light shielding member and condenses the light emitted from the light source into the plurality of transmission units.

14. The vehicle projection device according to claim 13, wherein the projection unit is controlled so as to simultaneously project a plurality of images corresponding to the plurality of transmission units onto the road surface in synchronization with the turn signal or the hazard signal, or sequentially project each image included in the plurality of images corresponding to the plurality of transmission units onto the road surface in synchronization with the turn signal or the hazard signal.

15. A vehicle lamp comprising:
- the vehicle projection device according to claim 1; and
- a turn lamp that blinks in synchronization with the turn signal, wherein the lighting control unit performs the lighting control of the turn lamp.

16. The vehicle lamp according to claim 15, wherein the turn lamp is subjected to the lighting control so as to start lighting at a time point later than a time point at which the light source of the projection unit starts lighting.

17. A method for controlling a vehicle projection device that includes:
- a projection unit that includes a light source and projects a predetermined image onto a road surface based on lighting of the light source; and
- a lighting control unit that performs lighting control of at least the light source of the projection unit, the method comprising:
receiving, by the lighting control unit, a turn signal or a hazard signal;
performing, by the lighting control unit, the lighting control of the light source of the projection unit such that a required time period from a first time point at which the light source of the projection unit starts lighting in response to an input of the turn signal or the hazard signal to a second time point at which the light source of the projection unit reaches a target light intensity ends later than a third time point at which a turn lamp or a hazard lamp is lit at a target light intensity of the turn lamp or the hazard lamp in response to the input of the turn signal or the hazard signal, and
performing, by the lighting control unit, the lighting control of the light source such that the required time period is shortened as a speed of an own vehicle increases.

* * * * *